(12) United States Patent
Kleinert et al.

(10) Patent No.: US 10,436,980 B2
(45) Date of Patent: Oct. 8, 2019

(54) CIRCUIT ASSEMBLY AND METHOD FOR PRODUCING A CIRCUIT ASSEMBLY

(71) Applicant: FRAUNHOFER-GESELLSCHAFT ZUR FÖRDERUNG DER ANGEWANDTEN FORSCHUNG E.V., München (DE)

(72) Inventors: Moritz Kleinert, Berlin (DE); Martin Schell, Berlin (DE)

(73) Assignee: FRAUNHOFER-GESELLSCHAF T ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 16/079,206

(22) PCT Filed: Feb. 21, 2017

(86) PCT No.: PCT/EP2017/053930
§ 371 (c)(1),
(2) Date: Aug. 23, 2018

(87) PCT Pub. No.: WO2017/144462
PCT Pub. Date: Aug. 31, 2017

(65) Prior Publication Data
US 2019/0094461 A1     Mar. 28, 2019

(30) Foreign Application Priority Data
Feb. 23, 2016   (DE) .................. 10 2016 202 765

(51) Int. Cl.
*G02B 6/12*      (2006.01)
*G02B 6/42*      (2006.01)
(Continued)

(52) U.S. Cl.
CPC ....... *G02B 6/12004* (2013.01); *G02B 6/1221* (2013.01); *G02B 6/13* (2013.01);
(Continued)

(58) Field of Classification Search
CPC .................. G02B 6/12004; G02B 6/13; G02B 2006/12069; G02B 2006/12142
(Continued)

(56) References Cited

U.S. PATENT DOCUMENTS 6,611,635 B1    8/2003   Yoshimura et al.
2002/0081056 A1*  6/2002  Kaneko .................... G02B 6/42
                                                          385/14
(Continued)

FOREIGN PATENT DOCUMENTS

WO       2015/081538 A1    6/2015

OTHER PUBLICATIONS

Kleinert, M., et al., "Graphene-based electro-absorption modulator integrated in a passive polymer waveguide platform," Optical Materials Express, vol. 6, Issue 6, pp. 1800-1807 (2016).
(Continued)

*Primary Examiner* — Jerry M Blevins
(74) *Attorney, Agent, or Firm* — Maschoff Brennan

(57) ABSTRACT

It is provided a circuit assembly, comprising at least one electronic circuit; at least one optical waveguide, wherein the core and the cladding of the optical waveguide are formed of an amorphous material; at least one carrier on which the optical waveguide is arranged; and at least one electro-optically active material layer electrically connected to the electronic circuit. The at least one electro-optically active material layer at least partially extends in the optical waveguide and the electrical connection between the electronic circuit and the at least one electro-optically active material layer is produced in that at least one electrical
(Continued)

contact extends from the electronic circuit through at least one section of the cladding of the optical waveguide to the at least one electro-optically active material layer or is connected to a section of the electro-optically active material layer, which protrudes from the cladding of the optical waveguide.

20 Claims, 24 Drawing Sheets

(51) Int. Cl.
  *G02F 1/01* (2006.01)
  *G02B 6/122* (2006.01)
  *G02B 6/13* (2006.01)
  *G02F 1/025* (2006.01)
  *G02B 6/43* (2006.01)

(52) U.S. Cl.
  CPC .............. *G02B 6/42* (2013.01); *G02B 6/43* (2013.01); *G02F 1/011* (2013.01); *G02F 1/025* (2013.01); *G02B 6/428* (2013.01); *G02B 2006/12069* (2013.01); *G02B 2006/12126* (2013.01); *G02B 2006/12142* (2013.01)

(58) Field of Classification Search
  USPC .......................................................... 385/14
  See application file for complete search history.

(56) References Cited

U.S. PATENT DOCUMENTS

| | | | |
|---|---|---|---|
| 2009/0026479 | A1 | 1/2009 | Hikita et al. |
| 2010/0316330 | A1* | 12/2010 | Kim ....................... G02B 6/138 385/14 |
| 2013/0056623 | A1* | 3/2013 | Lipson ............... G02B 6/29341 250/227.11 |
| 2013/0071083 | A1* | 3/2013 | Kim ........................ G02B 6/12 385/131 |
| 2014/0099052 | A1 | 4/2014 | Takaoka et al. |
| 2015/0309340 | A1* | 10/2015 | Abel ....................... G02F 1/025 385/2 |
| 2015/3009340 | | 10/2015 | Abel et al. |
| 2017/0315316 | A1* | 11/2017 | Tanaka .................. G02B 6/122 |

OTHER PUBLICATIONS

Koester, S., and Li, M., "Waveguide-Coupled Graphene Optoelectronics," IEEE Journal of Selected Topics in Quantum Electronics, vol. 20, Issue 1 (2014).
Pospischil, A., et al., "CMOS-compatible graphene photodetector covering all optical communication bands," Nature Photonics, vol. 7, pp. 892-896 (Nov. 2013).
Schröeder, H., et al., "glassPack—A 3D Glass Based Interposer Concept for SiP with Integrated Optical Interconnects," 2010 Proceedings 60th Electronic Components and Technology Conference (ECTC) (Jun. 1-4, 2010).
Y. T., Hu, et al., "Broadband 10Gb/s Graphene Electro-Absorption Modulator on Silicon for Chip-Level Optical Interconnects," IEEE International Electron Devices Meeting, pp. 5.6.1-5.6.4 (2014).
Youtsey, C., et al., "Epitaxial Lift-Off of Large-Area GaAs Thin-Film Multi Junction Solar Cells," CS MANTECH Conference, Boston, Massachusetts, USA (Apr. 23-26, 2012).
Phare, C.T., et al., "Graphene electro-optic modulator with 30 GHz bandwidth," Nature Photonics, vol. 9, No. 8 pp. 511-514 (Jul. 13, 2015).
"Polymer waveguides for electro-optical integration in data centers and high-performance computers", Roger Dandel et al., Optics Express, p. 4736, vol. 23, No. 4, Jan. 2015.

* cited by examiner

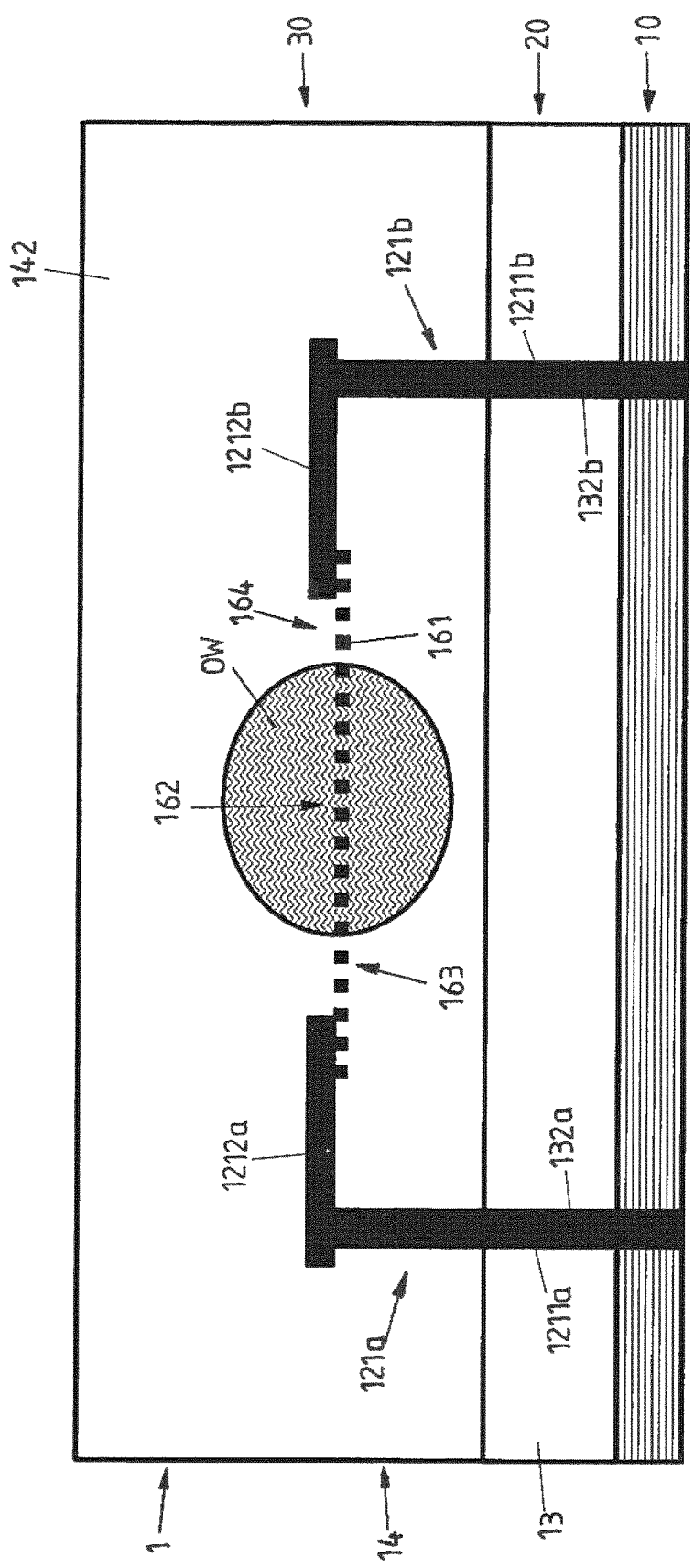

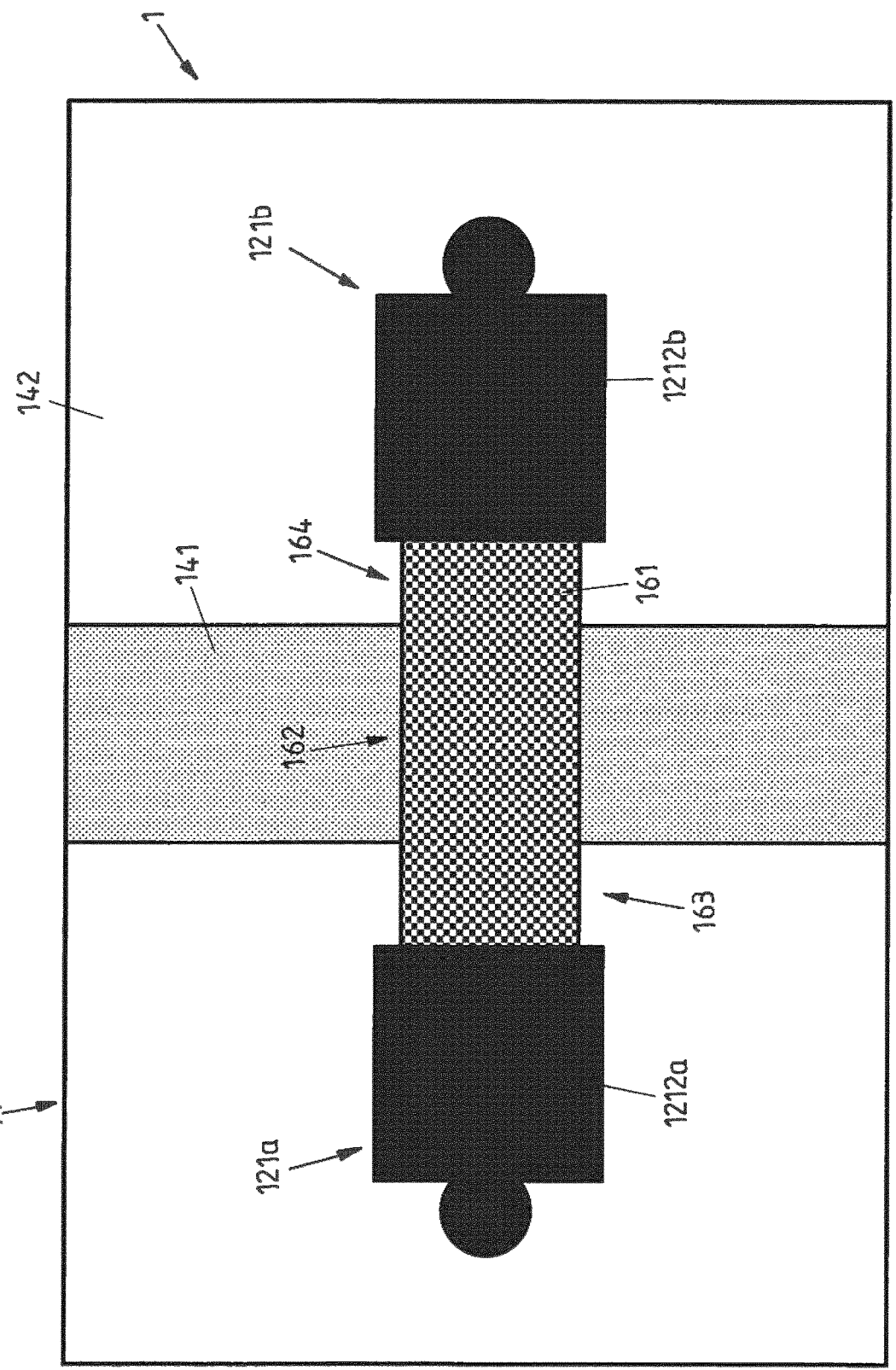

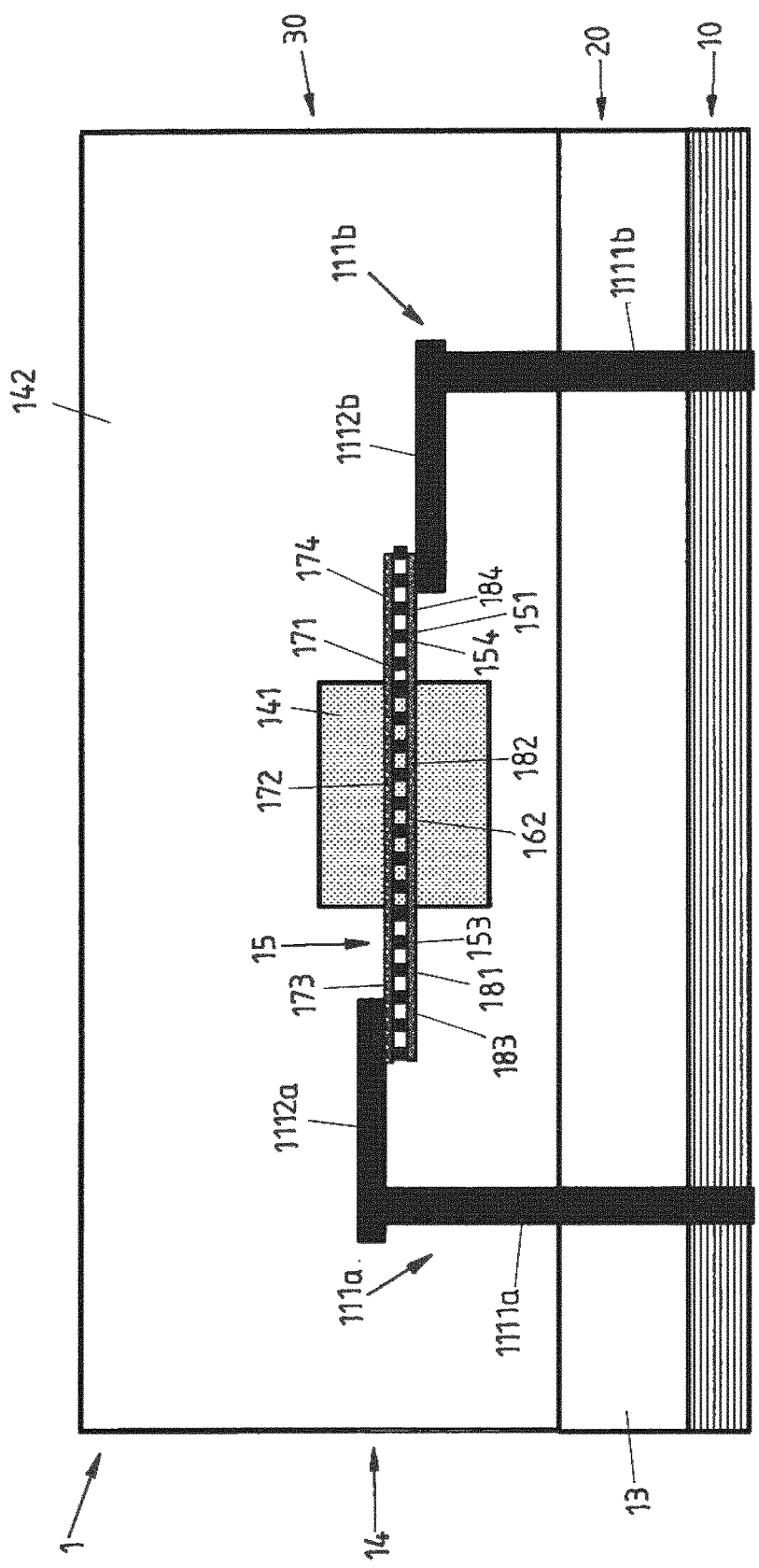

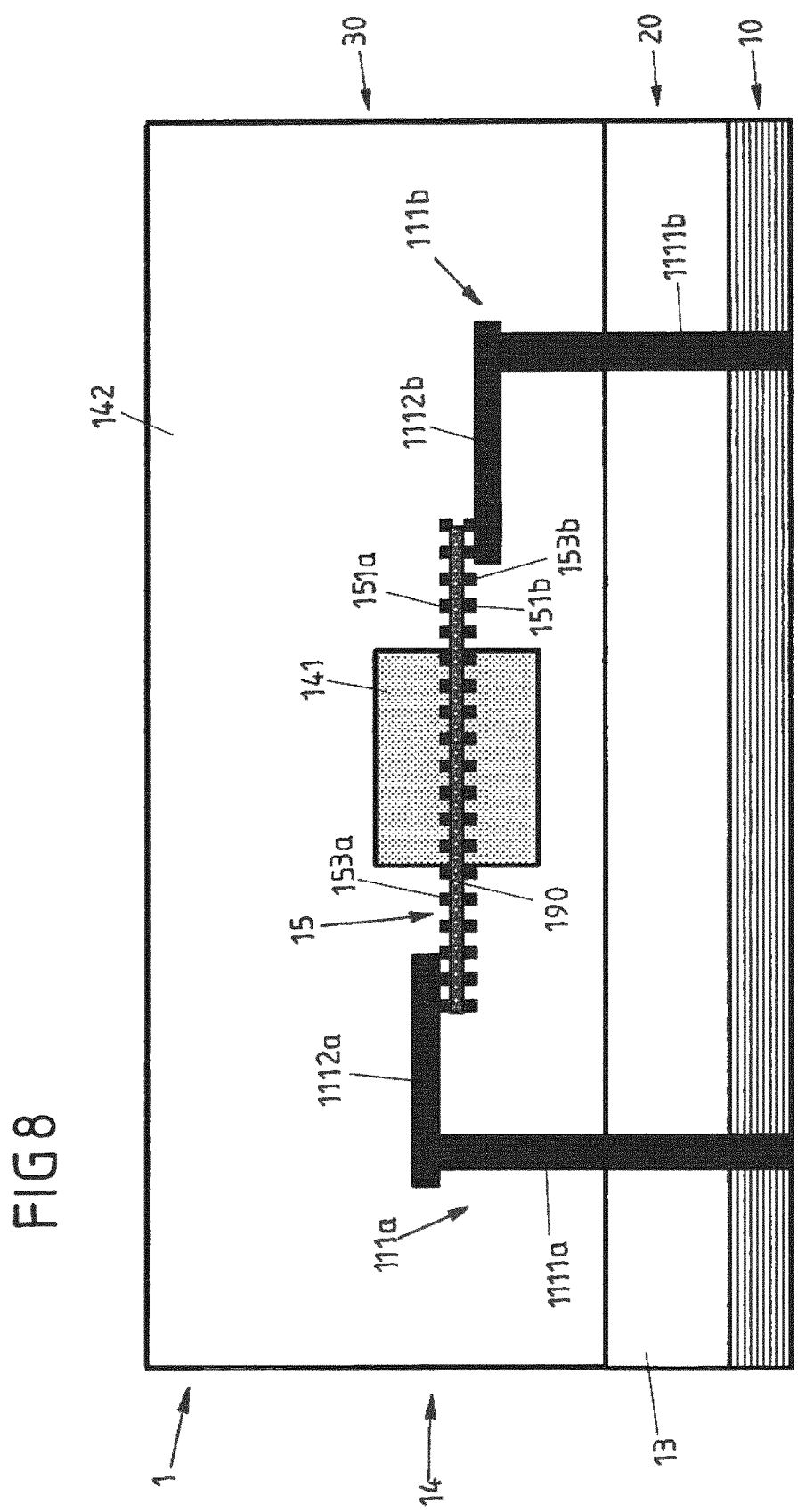

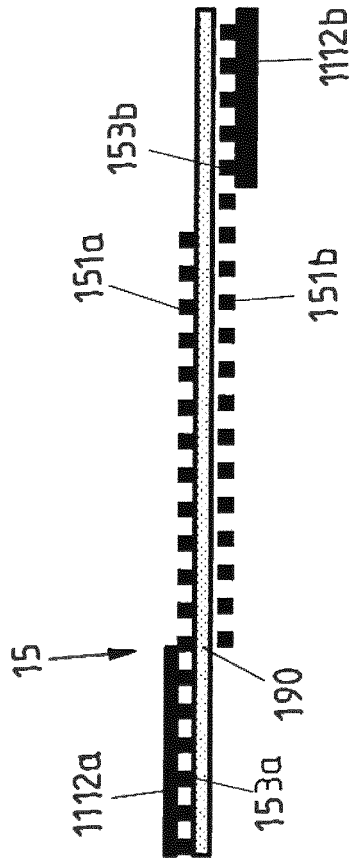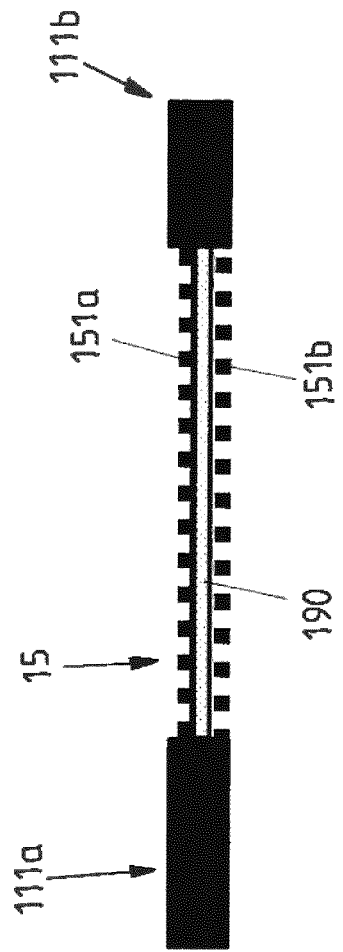

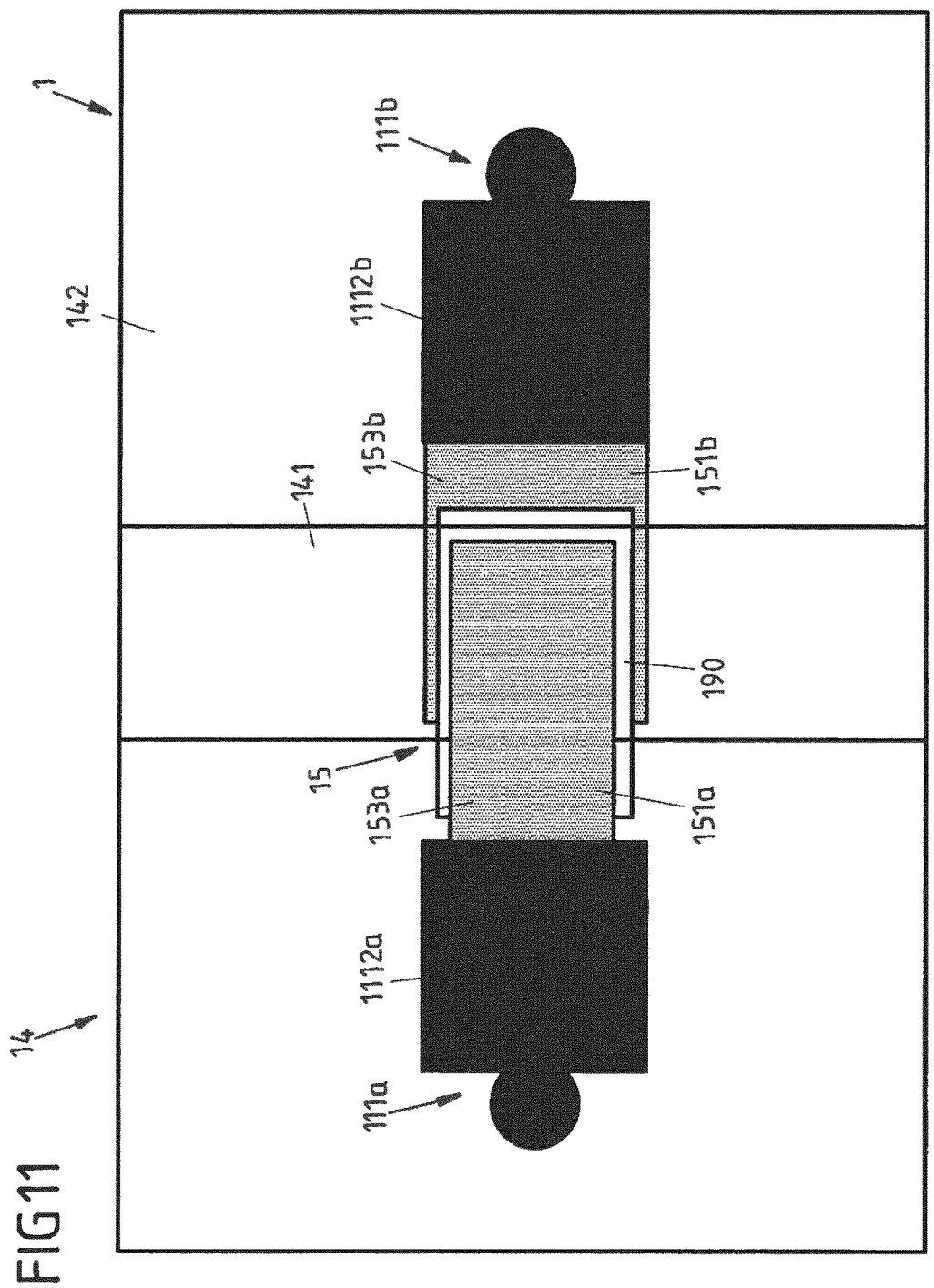

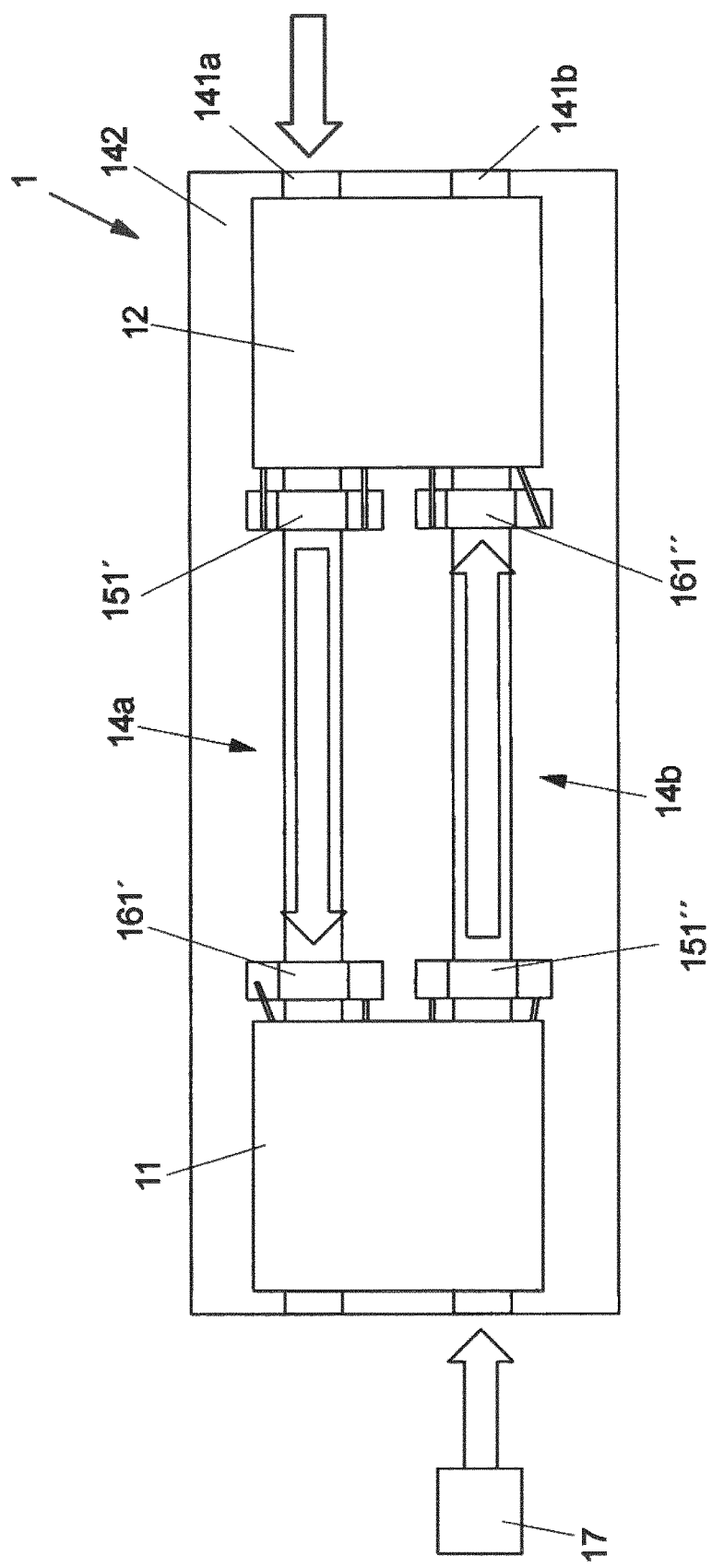

CIRCUIT ASSEMBLY AND METHOD FOR PRODUCING A CIRCUIT ASSEMBLY

CROSS-REFERENCE TO A RELATED APPLICATION

This application is a National Phase Patent Application of International Patent Application Number PCT/EP2017/053930, filed on Feb. 21, 2017, which claims priority of German Patent Application 10 2016 202 765.4, filed on Feb. 23, 2016.

BACKGROUND

This invention relates to a circuit assembly and to a method for producing a circuit assembly. Circuit assemblies e.g. in the form of electric circuit boards (printed circuit boards—PCBs), on which integrated electric circuits (IC) are connected to each other by electric conductor paths, are known. For example, electric circuits are arranged on both sides of a carrier of the circuit board, which are connected to each other by means of electric vias. The vias are produced in the carrier of the circuit board for example by laser drilling or etching. Furthermore, circuit boards (multilayer circuit boards) are known, which comprise a plurality of carriers arranged one above the other. At higher data rates optical connections increasingly are advantageous or even necessary even with short transmission paths. It is known for example to optically connect racks or also processor cards to each other in data centers ("optical backplane"). At the output of a rack or at an edge of a card an electro-optical conversion takes place, wherein e.g. light of a laser is modulated with a signal. The modulated optical signal is passed to a target rack or a target card by means of a glass fiber or other flexible waveguides. There, an optoelectronic reconversion is effected by means of a detector.

As in particular optical connections are to be realized, which not only extend from and to an edge of the circuit board, but are meant to connect a plurality of areas of the circuit board to each other, the optical plane of the circuit board is mounted not beside, but below the electrical plane of the circuit board. Coupling of light into the optical plane (into an optical waveguide formed there) is effected through through-openings in the carrier of the circuit board, wherein e.g. deflection mirrors are etched into the optical waveguide in order to couple the light into the waveguide or to direct the light from the waveguide in the direction of a detector disposed in the electrical plane. The optical plane, i.e. the optical waveguides of such circuit boards, is realized e.g. by means of layers of different polymer materials, as described for example in the article "Polymer waveguides for electro-optical integration in data centers and high-performance computers", Roger Dandel et al., OPTICS EXPRESS, p. 4736, Vol. 23, No. 4. What can be problematic in such optical circuit boards is the coupling of light by means of a free beam through through-openings of the carrier of the circuit board into the optical waveguide(s).

SUMMARY

A problem underlying the invention consists in creating a circuit assembly which provides for a generation and transmission of optical signals as efficient as possible.

This problem is solved by providing a circuit assembly with features as described herein and by the production method with features as described herein.

Accordingly, there is provided a circuit assembly, comprising:
- at least one electronic circuit;
- at least one optical waveguide, wherein the core and the cladding of the optical waveguide are formed of an amorphous material;
- at least one carrier on which the optical waveguide is arranged; and
- at least one electro-optically active material layer electrically connected to the electronic circuit, wherein
- the at least one electro-optically active material layer at least partially extends in the optical waveguide and the electrical connection between the electronic circuit and the at least one electro-optically active material layer is established in that at least one electrical contact extends from the electronic circuit through at least one section of the cladding (of the amorphous material) of the optical waveguide to the at least one electro-optically active material layer (e.g. the contact extends through a cutout in the cladding material) or is connected to a section of the electro-optically active layer which protrudes (in particular laterally) from the cladding of the optical waveguide.

The circuit assembly according to the invention for example is an optical circuit board, wherein the at least one electronic circuit (e.g. configured in the form of an integrated circuit) is part of an electrical plane and the optical waveguide is part of an optical plane of the circuit board. The carrier (of in particular plate-like form and in particular at least substantially rigid) serves e.g. for the arrangement and mechanical stabilization of the electrical plane and/or the optical plane. For example, the carrier is formed of an electrically non-conductive material (e.g. a composite material like FR 4). Of course, a plurality of electrical circuits and/or a plurality of optical waveguides can be provided on the carrier. For example, via the optical waveguide an optical data connection between two electrical circuits is realized. It is also conceivable that the circuit assembly according to the invention is a microchip, wherein the carrier is configured in the form of a substrate (in particular of a semiconductor substrate) on which the electronic circuit is arranged.

By integrating the electro-optically active material layer into the optical waveguide, free-beam coupling of light of a light source arranged in another plane than the optical waveguide, which potentially involves optical losses and possibly requires an awkward adjustment, can be omitted. In addition, the light source can be arranged at a distance to the electrical plane of the circuit assembly, whereby e.g. the dissipation of heat from the laser can be improved.

The electro-optically active material layer in particular is configured to convert an electrical signal received from the electronic circuit via the electrical contact into an optical signal propagating in the optical waveguide and/or to convert an optical signal propagating in the optical waveguide into an electrical signal to be passed to the electronic circuit via the electrical contact. For example, the electro-optically active material layer provides for high-rate electro-optical conversions, for example for transmission rates above 1 Gb/s. The electro-optically active material layer forms e.g. a light detector (e.g. in the form of a photoconductor detector or a photodiode) and/or a modulator (e.g. an absorption modulator), by means of which light of a light source spaced apart from the electro-optical material layer and in particular external to the optical waveguide is modulated.

The electro-optically active material layer in addition can be used for light amplification or light generation. For this purpose, the electro-optically active material layer is configured e.g. as a p-i-n heterostructure and is pumped to the inversion by an injection current.

The optical waveguide e.g. has an effective index of refraction $n_{eff}$<1.8. It is conceivable in particular that the optical waveguide is designed such that an optical wave guided in the same has a cross-section (e.g. diameter) which is greater than 1 µm, e.g. greater than 5 µm or greater than 7 µm. In particular, the core of the optical waveguide has dimensions which are distinctly larger than the dimensions of the electro-optically active material layer (in particular greater than its thickness). Moreover, the optical waveguide in particular is formed as a single-mode waveguide and can include e.g. passive components such as curvatures, crossings, wavelength filters, splitters or combiners and/or active components such as electrically actuatable path switches, wavelength filters and/or power attenuators.

According to one aspect of the invention, the electro-optically active material layer at least partially extends in a core of the optical waveguide. It is also conceivable that the electro-optically active material layer at least partially adjoins the core, in particular it adjoins the core from above (i.e. adjoins a side facing away from the substrate) or from below (i.e. adjoins a side facing the substrate).

The electro-optically active material layer in addition in particular is at least partially embedded (e.g. potted) in the optical waveguide. This becomes possible for example in that the optical waveguide is at least partially formed of an amorphous material which was produced on the carrier from the liquid phase or the gas phase (e.g. in several steps). The material (e.g. a polymer material) can be spin-coated onto the carrier (in particular over a large surface), so that a large-surface connection between the waveguide and the carrier is obtained. It is conceivable that the connection between the waveguide and the carrier extends over an area of at least 10 cm$^2$, at least 25 cm$^2$, at least 50 cm$^2$ or at least 100 cm$^2$.

For example, the optical waveguide is formed of a plurality of layers of such a material, wherein after being arranged on the carrier and possibly after curing, the amorphous material layers e.g. have a sufficient elasticity which allows an arrangement of the electro-optically active material layer between at least two of the amorphous material layers and e.g. also a compression with further carriers.

For example, the optical waveguide (such as the above-mentioned amorphous material layers) is at least partially formed of a polymer material, silicon dioxide and/or silicon nitride. Suitable polymers to be applied from the liquid phase include e.g. perfluorinated acrylates, ormocers, spin-on-glass polymers (Si—O-polymers) or silicones. In particular, the silicon dioxide (e.g. deposited from the gas phase) and/or silicon nitride can also be doped for adjusting the index of refraction.

One aspect of the circuit assembly according to the invention provides that the electronic circuit and the optical waveguide are arranged on different sides of the carrier. The electrical contact in particular extends through a through-opening of the carrier.

It is also possible that the optical waveguide is disposed between two carriers, i.e. a multilayer circuit assembly (in particular a multilayer circuit board) is realized. For example, at least one electronic circuit each is disposed on a side of the carriers facing away from the optical waveguide. According to another variant of the invention, the optical waveguide extends between the electronic circuit and the carrier. In particular, the electronic circuit is arranged on the optical waveguide (in particular on a cladding layer of the optical waveguide), wherein however at least one further material layer can be disposed between the optical waveguide and the electronic circuit. It is also possible, however, that the electronic circuit is disposed directly on the optical waveguide. As mentioned already, the at least one electro-optically active material layer can convert an electrical signal into an optical signal and/or conversely an optical signal into an electrical signal. In this connection it is pointed out that the term "electro-optically active" of course does not only refer to the fact that an electrical signal is converted into an optical signal, but also the opposite direction, according to which an optical signal is converted into an electrical signal (i.e. the opto-electronic conversion), or can refer to both directions. The electro-optically active material layer in particular is formed of another material than the optical waveguide.

It is conceivable that the material of the electro-optically active layer is selected such that it is active at light wavelengths in the range of 0.6 µm to 1.7 µm, in particular in a range of 0.95 µm to 1.7 µm; i.e. it can absorb light and/or its (complex) index of refraction can be varied via applied electric voltages.

For example, the electro-optically active material layer includes a two-dimensional material or is formed of such a material. A "two-dimensional material" for example is a material layer which consists of an atom layer or of maximally 10 atom layers of a material. For example, the layer is formed of graphene, triazine-based graphitic carbon nitride, germanene, molybdenum disulfide, molybdenum diselenide, silicene and/or black phosphorus or includes at least one of these materials, namely each with one or several atom layers. It is of course also conceivable that the two-dimensional material (e.g. the above-mentioned graphene) includes a dopant.

It is also possible, however, that the active material layer includes a semiconductor material or is formed of a semiconductor material (in particular epitaxially). For example, the semiconductor material is a III-V semiconductor material (e.g. epitaxially grown InGaAs on InP). By means of an Epitaxy-Lift-Off method (ELO method) thin epitaxial layers (e.g. having a thickness in the nm range) can be detached from the substrate due to a "sacrificial layer" facing an epitaxial substrate and a mechanical carrier (e.g. made of metal). The thin epitaxial layer remaining on the carrier can then be transferred to another layer (e.g. a polymer layer for forming the optical waveguide) and be further processed there.

The (in particular electrically insulating) amorphous material of the optical waveguide, other than the crystalline III-V semiconductor material or the two-dimensional material, can be arranged in principle on any carrier. With the circuit assembly according to the invention two different types of material (amorphous material of the waveguide and crystalline or two-dimensional material of the electro-optically active layer) hence can be combined with each other.

For example, a plurality of electro-optically active material layers is present, which differ in their band gap and/or in their doping (and e.g. form a p-i-n heterostructure).

According to another development of the invention, the electrical contact is connected to a section of the electro-optically active material layer which extends outside a core of the optical waveguide. For example, the electro-optically active material layer includes a first section which extends through the core of the optical waveguide, and a second section which is disposed outside the core of the optical waveguide. The electrical contact then is connected to the second section of the electro-optically active material layer;

e.g. via a section which extends at an angle (in particular perpendicularly) to the second section of the electro-optically active material layer.

The invention also relates to a method for producing a circuit assembly, which in particular is configured as described above, comprising the following steps:

providing a carrier;

arranging an amorphous material layer on the carrier, which forms a section of a cladding of an optical waveguide;

arranging at least one electro-optically active layer on the amorphous material layer (wherein the electro-optically active layer very well can extend beyond the amorphous material layer);

producing an electrical contact which at least partially extends through the amorphous material layer (and e.g. also through the carrier) (for example through a cutout in the amorphous material layer) or past the amorphous material layer up to the electro-optically active layer.

According to a variant of the method according to the invention the at least one electro-optically active layer is disposed on a carrier material different from the carrier before being arranged on the amorphous material layer, which carrier material is removed after arranging the electro-optically active layer on the amorphous material layer. For example, the at least one electro-optically active layer is structured after removing the carrier material (e.g. such that at least two partial areas separate from each other are obtained).

In addition, a cutout is produced for example in the amorphous material layer, and the cutout is filled with a core material before arranging the electro-optically active layer in order to produce at least a part of a core of the optical waveguide, wherein the electro-optically active layer is arranged on the amorphous material layer such that it extends across the core material, wherein the electrical contact can be produced in particular with a distance to the core material; in particular in order to avoid or at least minimize an attenuation of the optical wave.

It is also conceivable that on the amorphous material layer and the electro-optically active layer a core material layer is arranged and structured such that it forms at least one part of a core of the optical waveguide, wherein the core will have a distance to the electrical contact of the electro-optically active layer. In a first step, for example, a first (e.g. lower) section of the waveguide core and in a second step after arranging the electro-optically active layer a second (e.g. upper) section of the waveguide core can be produced, wherein the first and the second section of the waveguide core are disposed on different sides of the electro-optically active layer. It is also conceivable, however, that the waveguide core extends only on one side of the electro-optically active layer.

After producing the core of the optical waveguide in particular a further amorphous material layer is produced, which forms a further section of the cladding of the optical waveguide.

The amorphous material layer in particular is a layer of a polymer material, silicon dioxide and/or silicon nitride, or a layer which includes such a material.

BRIEF DESCRIPTION OF THE DRAWINGS

The invention will be explained in detail below by means of exemplary embodiments with reference to the Figures.

FIG. 5 shows a modification of FIG. 4.

FIG. 6 shows a top view of the circuit assembly of FIG. 5.

FIG. 7 shows a section through a circuit assembly of the invention according to another exemplary embodiment of the invention.

FIG. 8 shows a modification of FIG. 7.

FIGS. 9 and 10 show further modifications of FIG. 7.

FIG. 11 shows the modification of FIG. 10 in a top view.

FIG. 25 shows a top view of a circuit assembly according to another exemplary embodiment of the invention.

DETAILED DESCRIPTION

Figure 1:
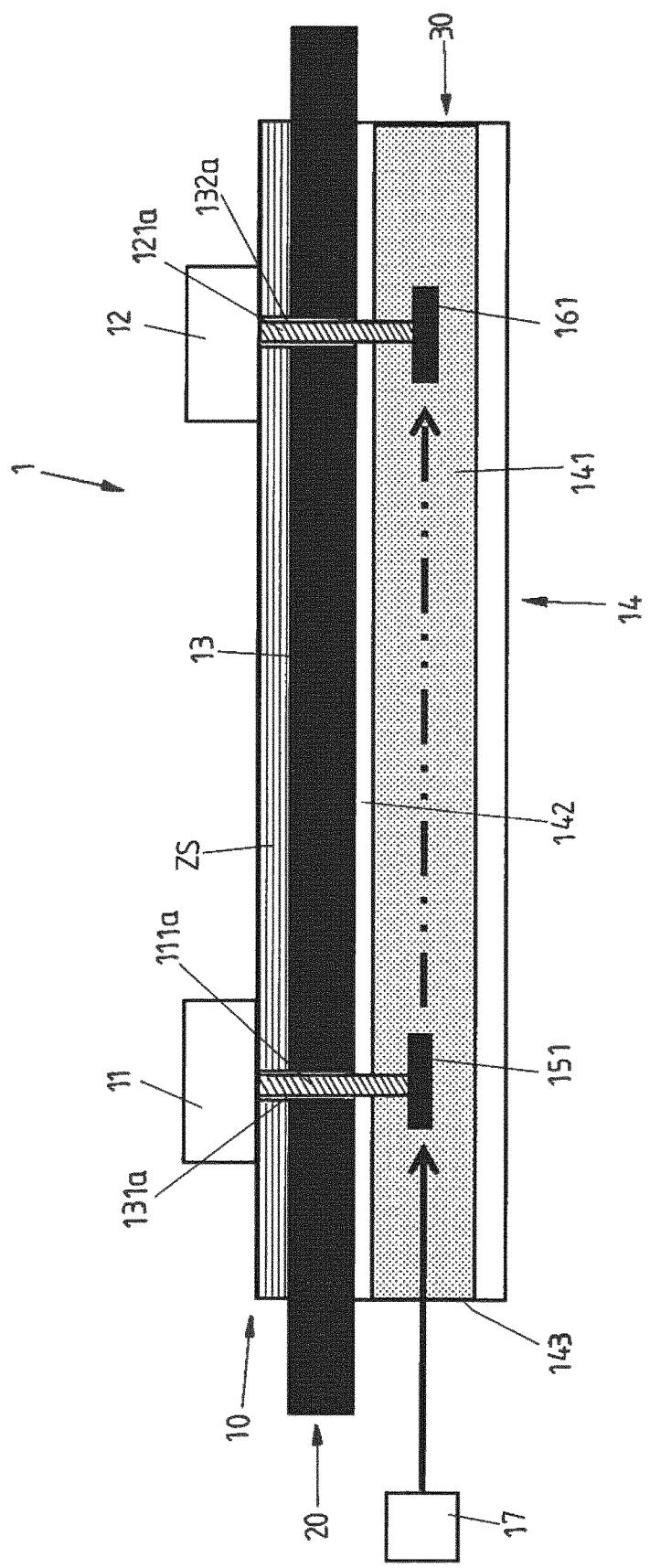
FIG. 1 shows a sectional view of a circuit assembly according to a first exemplary embodiment of the invention.

FIG. 1 shows a sectional view of a circuit assembly according to the invention in the form of an optical circuit board 1. The optical circuit board 1 comprises a first and a second electronic circuit in the form of a first and a second IC 11, 12. The ICs 11, 12 are part of an electrical plane 10 of the optical circuit board 1.

The ICs 11, 12 are arranged on a carrier plate 13 (e.g. in the form of an FR 4 plate) of the circuit board 1, wherein the carrier plate 13 forms a mechanical plane 20 of the circuit board. It is conceivable that the ICs 11, 12 are arranged directly on the carrier plate 13. It is also possible, however, that the connection to the carrier plate 13 is effected via an intermediate layer ZS.

On the side of the carrier plate 13 facing away from the ICs 11, 12 an optical plane 30 of the circuit board 1 is formed, which comprises at least one optical waveguide 14 (e.g. formed of a polymer) In the optical waveguide 14 (e.g. at least partially in a core 141 of the optical waveguide 14) opposite the first IC 11 a first electro-optically active material layer 151 is disposed, which serves to convert an electrical signal of the first IC 11 into an optical signal. The optical signal generated by the first electro-optically active material layer 151 propagates in the optical waveguide 14 up to a second electro-optically active material layer 161, wherein the second electro-optically active material layer 161 is disposed opposite the second IC 12 and likewise is embedded in the optical waveguide 14.

The signal generated by the first electro-optically active material layer 151 is converted into an electrical signal and passed to the second IC 12 by the second electro-optically active material layer 161. Thus, an optical communication connection between the ICs 11, 12 is realized via the optical waveguide 14 and the two electro-optically active material layers 151, 161.

The electrical connection of the ICs 11, 12 with the respectively associated electro-optically active material layers 151, 161 is effected via two electrical contacts, one of which (contacts 111a, 121a) is each shown in FIG. 1. The electrical contacts 111a, 121a each extend perpendicularly to the carrier plate 13 through a through-opening (via) 131a, 132a of the carrier plate 13 and a cladding 142 of the optical waveguide 14 up to the respective electro-optically active material layer 151, 161. The conversion of the electrical signal into the optical signal and vice versa hence each is effected in the optical waveguide 14 itself, so that coupling of an optical signal from the electrical plane into the optical waveguide 14 (for instance through-openings in the carrier plate 13), which frequently involves losses, can be omitted.

The first electro-optically active material layer 151 in particular is configured as a modulator or forms a layer of a modulator, which modulates light of a light source 17 external to the electro-optically active material layer 151 and arranged outside the waveguide 14. The light emitted by the light source 17 is coupled into the waveguide 14 via a facet 143 of the same. The light source 17 for example is a laser (in particular a semiconductor laser), an LED or a fiber laser or a light source in combination with a fiber amplifier. For example, the light source 17 emits in the wavelength range of 0.6 µm to 1.7 µm, in particular in the range of 0.95 µm to 1.7 µm. The second electro-optically active material layer 161 is a receiver or forms a layer of a receiver, which is configured e.g. in the form of a photodiode (such as a p-i-n photodiode) or a photoconductor. It is also conceivable that both electro-optically active material layers 151 are configured both as a modulator (i.e. as a transmitter) and as a receiver in order to provide for a bidirectional data transmission between the two ICs 11, 12.

Figure 2:
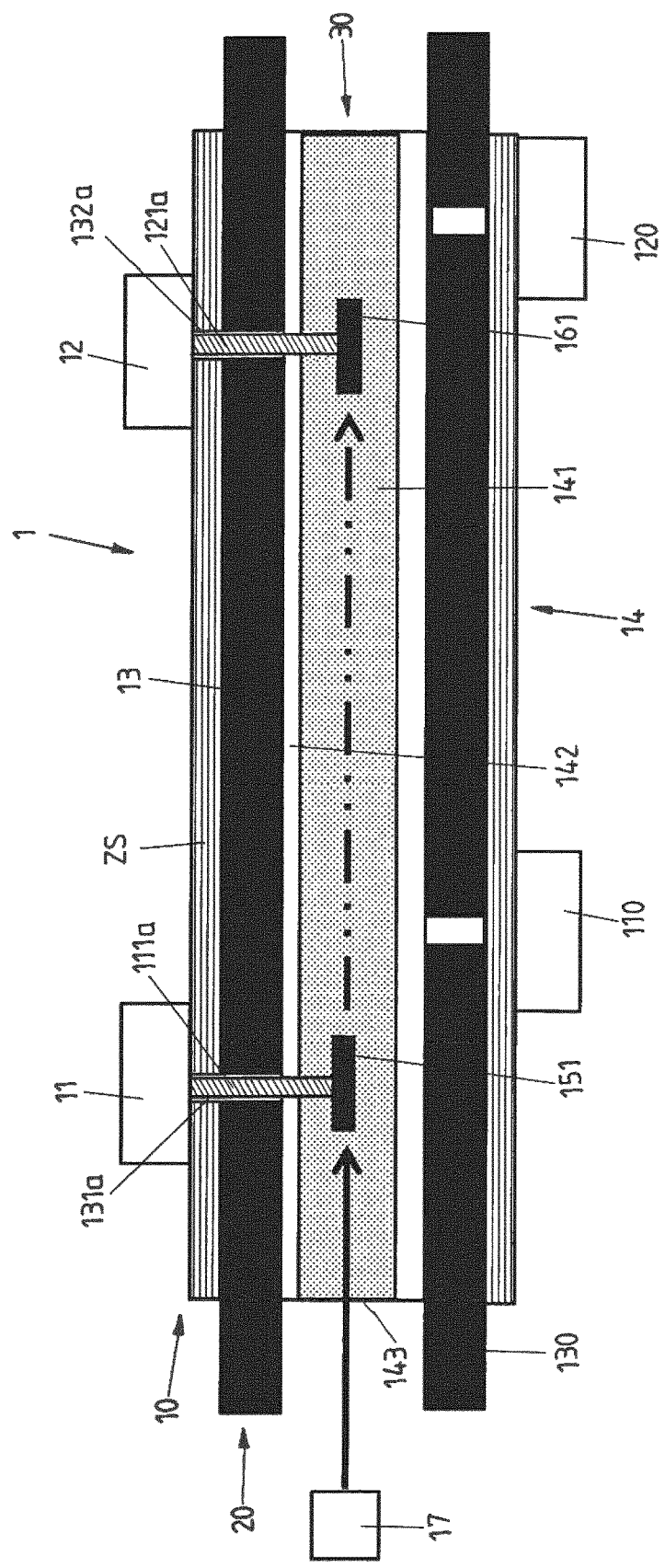
FIG. 2 shows a sectional view of a circuit assembly according to a second exemplary embodiment of the invention.

FIG. 2 relates to a development of FIG. 1, according to which a second mechanical plane is provided in the form of a second carrier plate 130 which is disposed on a side of the optical waveguide 14 facing away from the first carrier plate 13. The optical waveguide 14 hence extends between the two carrier plates 13, 130, wherein the cladding of the optical waveguide 14 can be in contact both with the first and with the second carrier plate 13, 130.

On the side of the second carrier plate 130 facing away from the optical waveguide 14 further ICs 110, 120 are arranged. It is conceivable that analogous to the ICs 11, 12 an optical communication connection also is realized between the ICs 110, 120; e.g. likewise via the optical waveguide 14 or via a further optical waveguide (not shown) which also extends between the carrier plates 13, 130.

Figure 3:
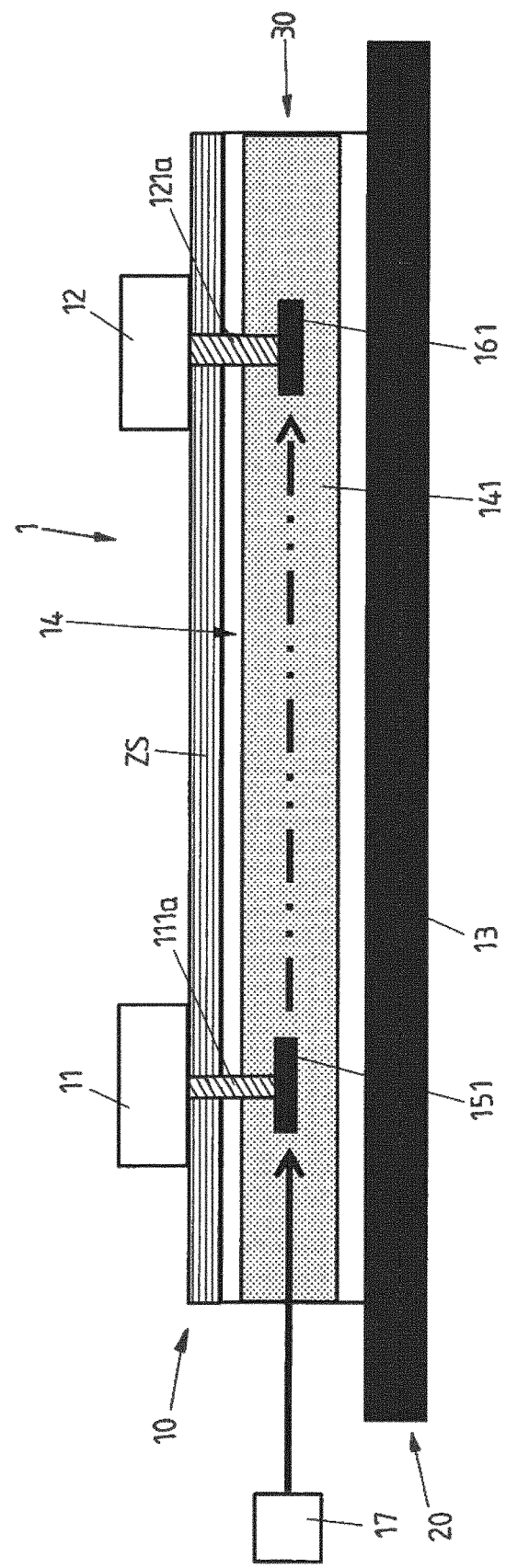
FIG. 3 shows a sectional view of a circuit assembly according to a third exemplary embodiment of the invention.

FIG. 3 relates to a further exemplary embodiment of the invention, according to which the electrical plane 10 (i.e. the ICs 11, 12) and the optical plane 30 (i.e. the at least one optical waveguide 14) are not arranged on different sides of the carrier plate 13, but on the same side. More exactly, the optical waveguide 14 with the electro-optically active material layers 151, 161 is disposed between the carrier plate 13 and the ICs 11, 12. It is possible that the ICs 11, 12 are arranged on the optical waveguide 14 directly or via a connecting layer. The electrical contacts 111a, 121a thus do not extend through the carrier plate 13, but through a section of the cladding 142 of the optical waveguide 14.

Figure 4:
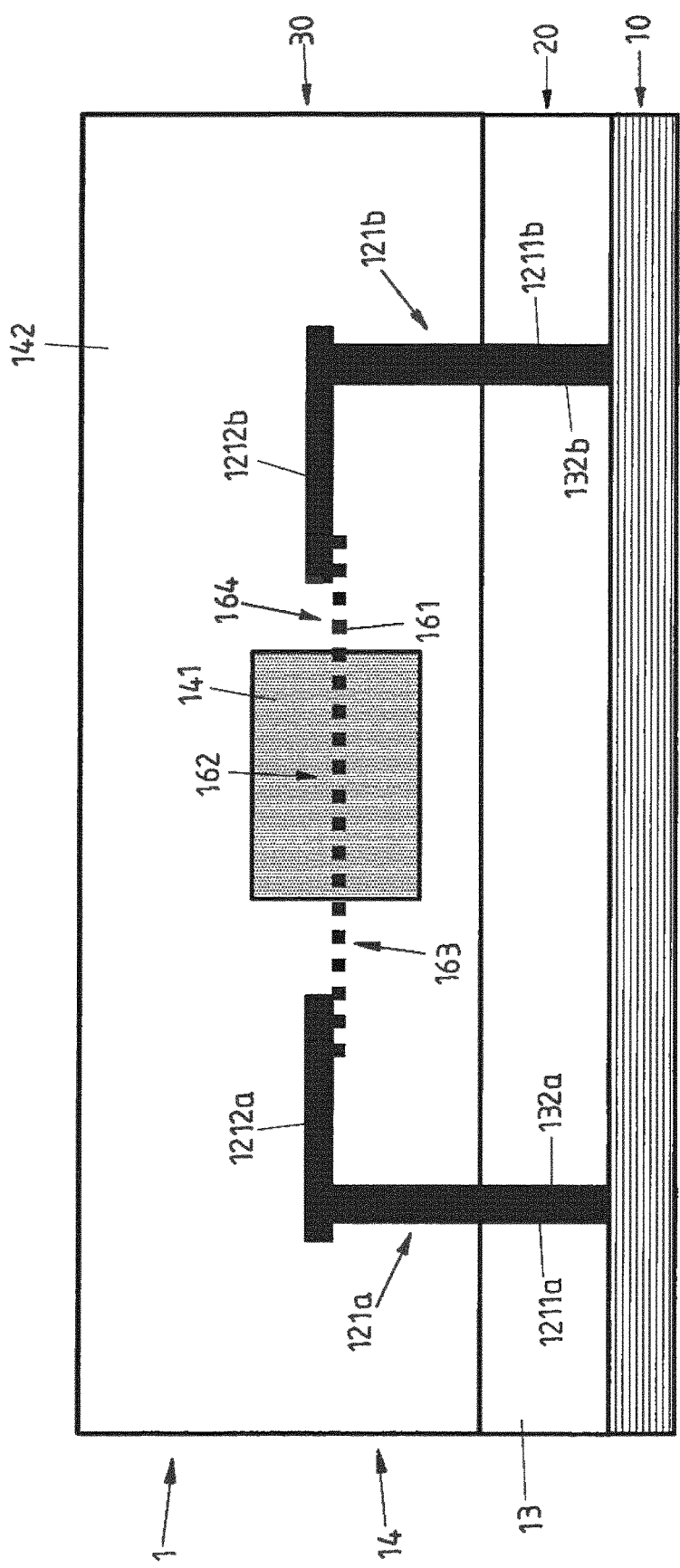
FIG. 4 shows a section through a circuit assembly according to the invention transversely to its optical waveguide.

FIG. 4 shows a section through an optical circuit board according to the invention in the region of an electro-optically active material layer 161, namely perpendicularly to the optical waveguide 14 of the circuit board 1. For example, the circuit board is configured as shown in FIG. 1; i.e. the electrical plane 10 and the optical plane 30 are disposed on different sides of the carrier plate 13, wherein the illustrated section extends e.g. at the level of the second IC 12 and the second electro-optically active material layer 161.

With a first (middle) section 162 the electro-optically active material layer 161 extends in the core 141 of the waveguide 14. A second and a third (lateral) section 163, 164 of the active layer 161 (integrally connected to the first section 152) extends outside the core 141 in the cladding 142 of the waveguide 14. The active layer 161 for example is a two-dimensional material. Suitable two-dimensional materials have already been explained above. It is conceivable that the active layer 161 is configured for the detection of light, wherein e.g. from the electrical plane a voltage is applied to the active layer and the modulated photocurrent generated on receipt of a light signal is measured.

For connecting the active layer 161 to the electrical plane 10 (e.g. to an IC like the IC 12 of FIG. 1) two electrical contacts 121a, 121b are provided, which extend through the carrier plate 13 to the active layer 161. More exactly, the contact 121a is connected to a section 163 of the active layer 161 disposed outside the waveguide core 141, while the other contact 121b contacts the other section 164 of the active layer 161 arranged outside the waveguide core 141. Thus, the contacts 121a, 121b protrude into a wave guided in the optical waveguide as little as possible. This is shown in FIG. 5, which shows an optical wave OW guided in the waveguide 14.

The contacts 121a, 121b each include a first section 1211a, 1211b, which extends perpendicularly to the carrier plate 13, and a second section 1212a, 1212b, wherein the second section 1212a, 1212b each extends at an angle from the first section 1211a, 1211b and is connected to the associated section 163, 164 of the active layer 161. In particular, the first sections 1211a, 1211b each extend perpendicularly to the second sections 1212a, 1212b.

The contacting explained with reference to FIG. 4 can, however, also be used in principle for other electro-optically active material layers; e.g. also for electro-optically active elements which comprise more than one active layer and/or which instead of a layer of a two-dimensional material include one layer or several layers of a semiconductor material (e.g. in the form of an Fe-doped InGaAs layer) (see e.g. FIGS. 7 to 11).

FIG. 6 shows the area of the circuit board 1 illustrated in FIGS. 4 and 5 in a top view.

Analogous to FIG. 4, FIG. 7 shows a section through a circuit board according to the invention in the region of an electro-optically active material layer 151 which in particular is part of a light modulator (e.g. corresponding to the first electro-optically active material layer 151 of FIG. 1). Analogous to FIG. 4, contacting is effected via electrical contacts 111a, 111b, namely via their second sections 1112a, 1112b, which each extend at an angle from the first sections 1111a, 1111b. In the exemplary embodiment of FIG. 7, the electro-optically active material layer 151 is part of a p-i-n diode structure, wherein on one side a p-doped layer 181 and on the other side an n-doped layer 171 adjoins the active layer 151. The layers 151, 181 and 171 in particular are III-V semiconductor layers; e.g. on the basis of indium phosphide, wherein the active layer 151 e.g. consists of InGaAs and the doped layers 171, 181 consist of p-doped or n-doped indium phosphide. For modulating an optical wave guided in the optical waveguide 14, which in particular is generated by a light source separate from the waveguide 14 (for instance in the manner of the light source 17 of FIG. 1), a modulated electric voltage is applied to the active layer 151 via the p-layer 171 and the n-layer 181. The voltage changes the index of refraction and the absorption of the active layer 151 and thus of the waveguide 14, whereby a light modulation can be generated in dependence on the applied voltage. Such an electro-optical element 15 can also be operated as a light receiver by measuring the photovoltages and/or photocurrents effected by an irradiation of light.

The layers 151, 171, 181 each include a middle section 152, 172, 182 which extends in the region of the waveguide core 141, and two lateral sections 153, 154, 173, 174, 183, 184 which extend outside the waveguide core 141 in the cladding 142 of the waveguide 14. The one contact 111a (on the left in FIG. 7) is connected to the left-hand lateral section 173 of the p-doped layer 171, while the right-hand contact 111b is connected to the right-hand lateral section 184 of the n-doped layer 181.

An alternative configuration of the electro-optical element 15 for modulating light is shown in FIG. 8. There are provided two electro-optically active layers 151a, 151b extending parallel to each other, which each are formed of a two-dimensional material and which are electrically separated from each other by a dielectric layer 190 (e.g. of silicon nitride or silicon oxide) extending between the same. The contacting of the electro-optical element 15 is effected similar to FIG. 7 via a contacting of a left-hand contact section 153a of the upper electro-optically active layer 151a with the left-hand contact 111a and a contacting of a right-hand contact section 153b of the lower electro-optically active layer 151b with the right-hand contact 111b.

FIGS. 9 and 10 show further possible configurations of an electro-optical element 15 of the circuit assembly according to the invention, which can be used both for light modulation and for light detection.

The electro-optical element 15 of FIG. 9 corresponds to that of FIG. 8, wherein however the active layers 151a, 151b do not completely overlap each other. Rather, the lower contact layer 151b does not extend into the region of the left-hand contact section 153a of the upper contact layer 151a, and the upper contact layer 151a does not extend into the region of the right-hand contact section 153b of the lower contact layer 151b. Via such a contacting, the electro-optical element 15 can be operated as a light modulator. The electro-optical element 15 of FIG. 9 is shown in FIG. 11 in a top view.

By contacting each of both the upper and the lower active layer 151a, 151b, i.e. by connecting the active layers 151a, 151b in parallel, a photoconductor detector is realized; cf. FIG. 10.

FIGS. 12 to 17 relate to steps during the production of a circuit assembly according to the invention in the form of a circuit board by using a variant of the method of the invention. There is each shown a section perpendicularly to a carrier plate 13. The electro-optical component of the circuit board, which is produced by this method, in particular can be used as a photoconductor detector.

Figure 12:
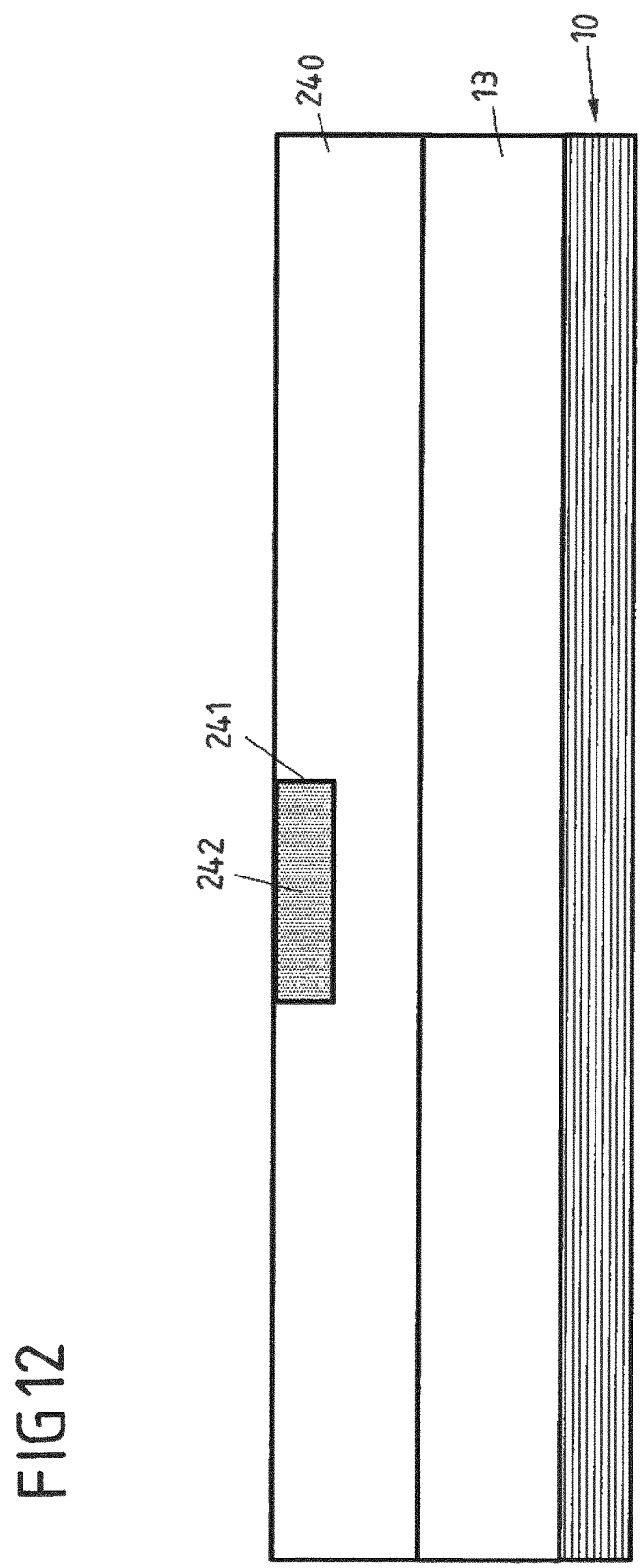
FIGS. 12 to 17 show steps in the production of a circuit assembly according to the invention with an electro-optical element in the form of a photoconductor.
Figure 13:
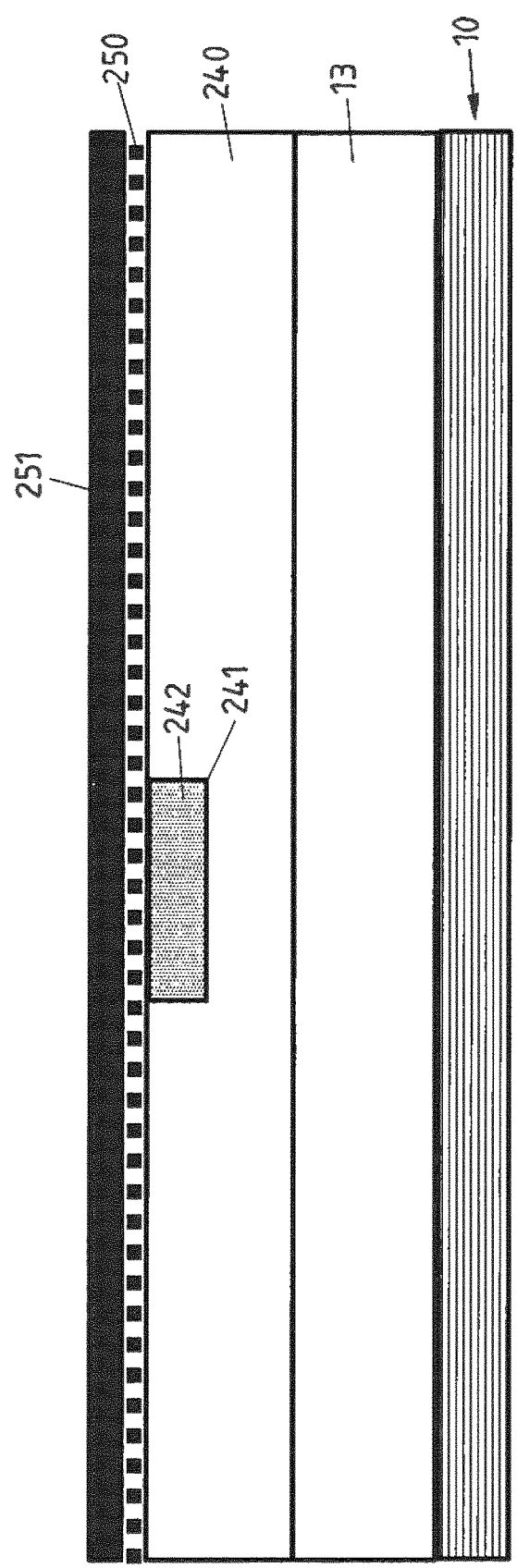
Figure 14:
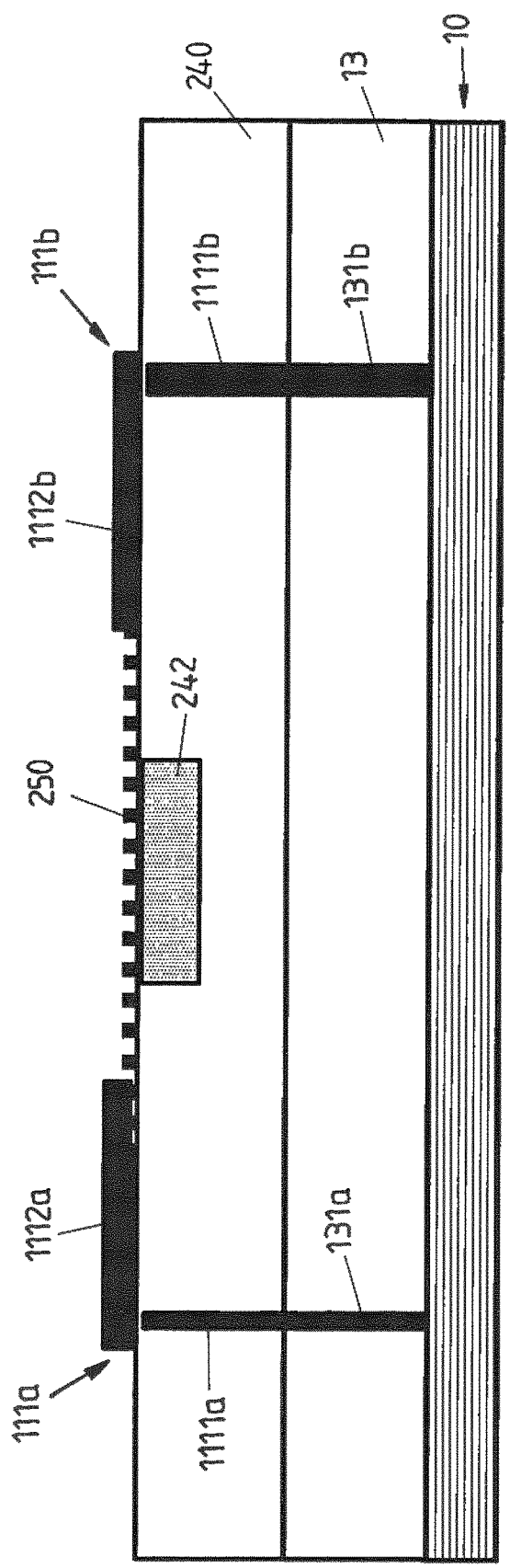
Figure 15:
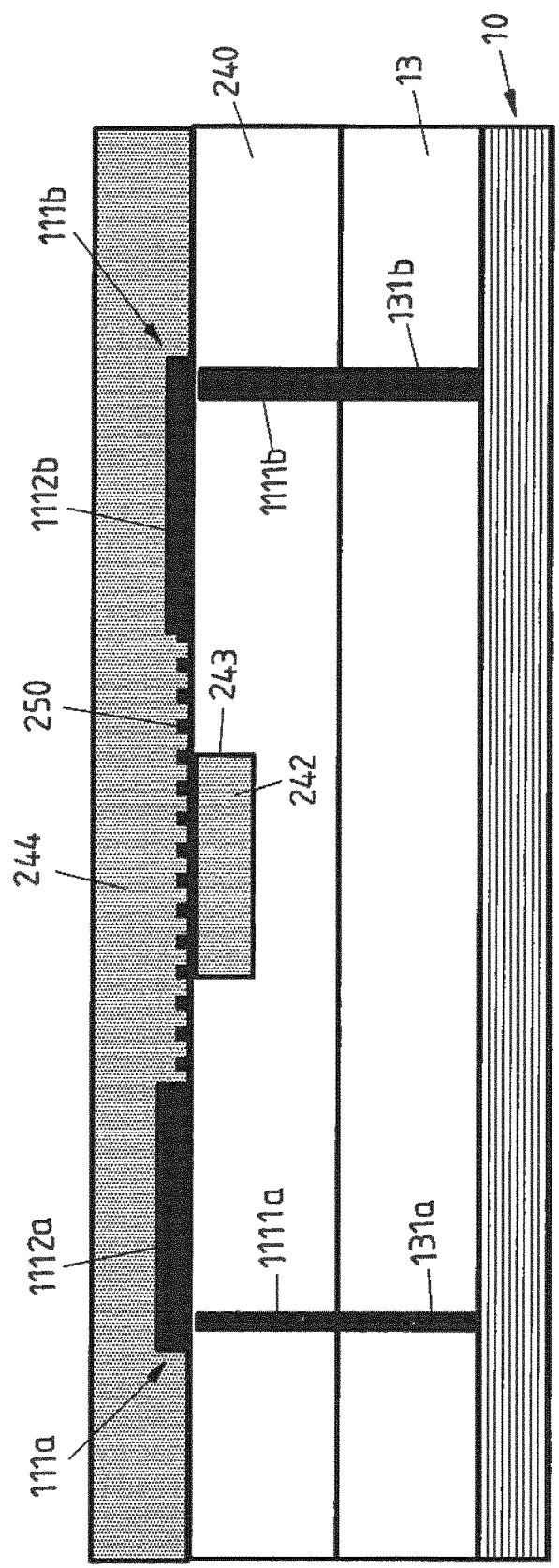

According to FIG. 12 a first polymer layer 240 initially is formed (e.g. by spin-coating the polymer material onto the carrier 13) on a side of the carrier plate 13 which forms a part of the cladding of an optical waveguide. At this time already an electrical plane 10 (e.g. including at least one conductor path) can at least partially be present on the carrier plate 13. It is also conceivable, however, that the electrical plane 10 is produced only later or at least is completed at a later date.

In a side of the polymer layer 240 facing away from the carrier plate 13 a cutout 241 (e.g. with a width of 3 to 7 µm) is produced (in particular by etching), which serves to form a section of the waveguide core. For example, the cutout 241 is produced with a depth (e.g. 2 to 4 µm) which at least approximately corresponds to half of the desired height of the waveguide core. The cutout 241 is filled with a core polymer material 242 which has a higher index of refraction than the polymer material of the polymer layer 240. The core polymer material 242 is applied in a sufficient thickness to fill the cutout 241, wherein excess material outside the cutout 241 is removed again.

Subsequently, a layer 250 of an electro-optically active material is produced on the polymer layer 240 and the core polymer material 242 (FIG. 13); e.g. consisting of a III-V semiconductor material or a two-dimensional material. It is conceivable that the layer 250 initially is disposed on a carrier 251 (e.g. a carrier foil made of metal, for example), which is removed after arranging the layer 250 on the polymer layer 240 (ELO method, as already mentioned above). The preparation of the active layer(s) will be described below separately for two-dimensional material and for III-V semiconductor layers. The thin active layer 250 will stay without further gluing, in particular due to van-der-Waals forces. Beside the transfer of the complete active layer 250 in one piece a transfer of smaller active segments may also be expedient. For example, an electro-optical conversion can be concentrated to selected areas of the circuit board 1. It is also conceivable that different active layers (layer segments) are arranged for different kinds of component functions.

In standard lithography and etching steps the carrier 251 now is removed completely and the active material layer 250 is removed wherever it is not needed. The material of the active layer 250 substantially will remain only at the desired points of the electro-optical conversions, e.g. protrude laterally from the waveguide core for contacting purposes.

After removing the carrier 251 and structuring the active layer 250, through-openings (vias) 131a, 131b now are produced in the carrier 13 and in the polymer layer 240 by further lithography steps and at least one etching step. Subsequently, first contact sections 1111a, 1111b are arranged (produced), which extend from an upper side of the polymer layer 240 facing the active layer 250 through the through-openings 131a, 131b up to the electrical plane 10 (i.e. up to a side of the carrier 13 facing away from the polymer layer 240). For example, the through-openings 131a, 131b are filled with a conductive material (e.g. soldering tin) to produce the first contact sections 1111a, 1111b. It is also conceivable that the production of the through-openings 131a, 131b and the first contact sections 1111a, 1111b is effected before arranging the active layer 250. It is also possible that the sections of the through-openings 131a, 131b in the carrier 13 and also the sub-section of the first contact sections 1111a, 1111b extending there already are present at the beginning of the circuit board production (in particular before producing the polymer layer 240). The arrangement of at least one electronic circuit on the carrier 13 is effected in particular after the production of at least the contact sections 1111a, 1111b.

On the upper side of the polymer layer 240 second contact sections 1112a, 1112b then are produced (e.g. by vapor-deposition of gold or another metal and structuring), which each are connected on the one hand to the first contact sections 1111a, 1111b and on the other hand to the active layer 250. The first and the second contact sections 1111a, 1111b, 1112a, 1112b together form the contacts 111a, 111b.

Figure 16:
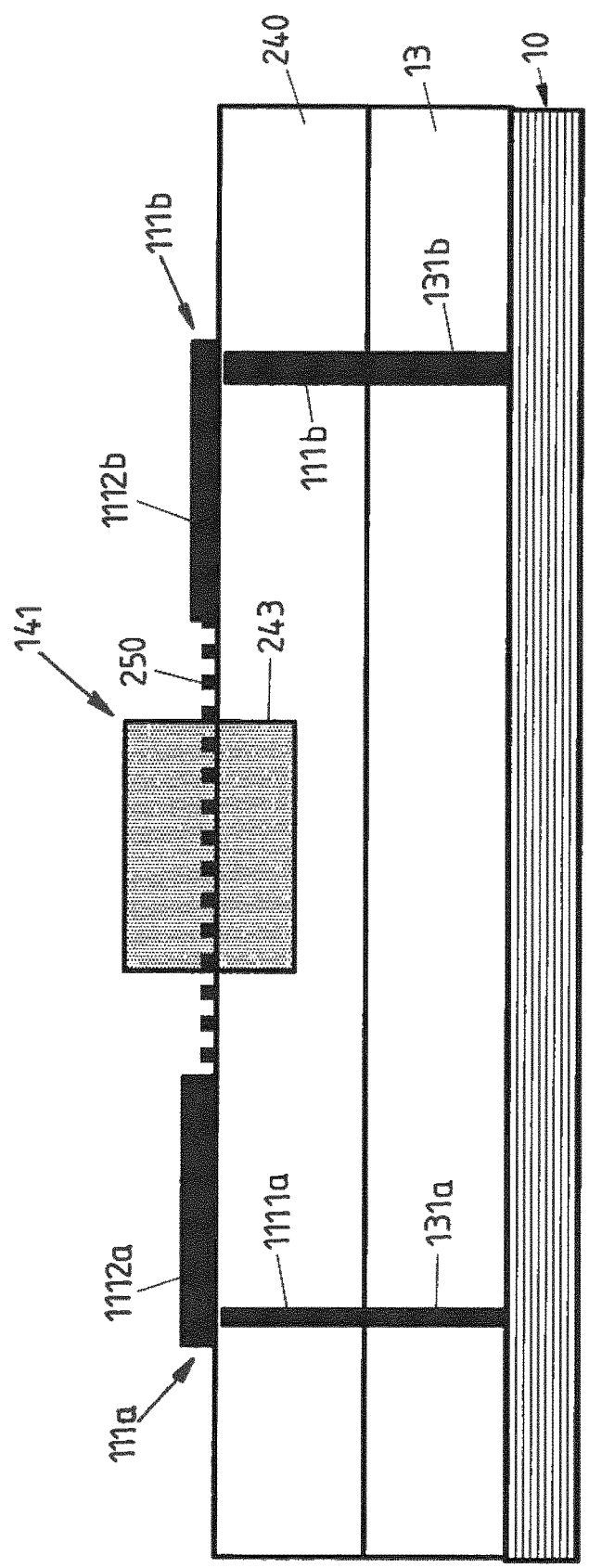

Thereafter, a further polymer layer 244 of core polymer material is produced, which at least partially covers the polymer layer 240, the second contact sections 1112a, 1112b and/or the active layer 250 (FIG. 15) and which serves to produce an upper section of the waveguide core. The polymer layer 244 fills possibly present ditches and can be planarized after its production. It is conceivable that the polymer layer 244 is produced with a thickness that corresponds to half of the desired height of the waveguide core. The polymer layer 244 is structured corresponding to the desired course of the optical waveguide (following the course of the cutout 243) in order to form the complete waveguide core 141 (FIG. 16).

Figure 17:
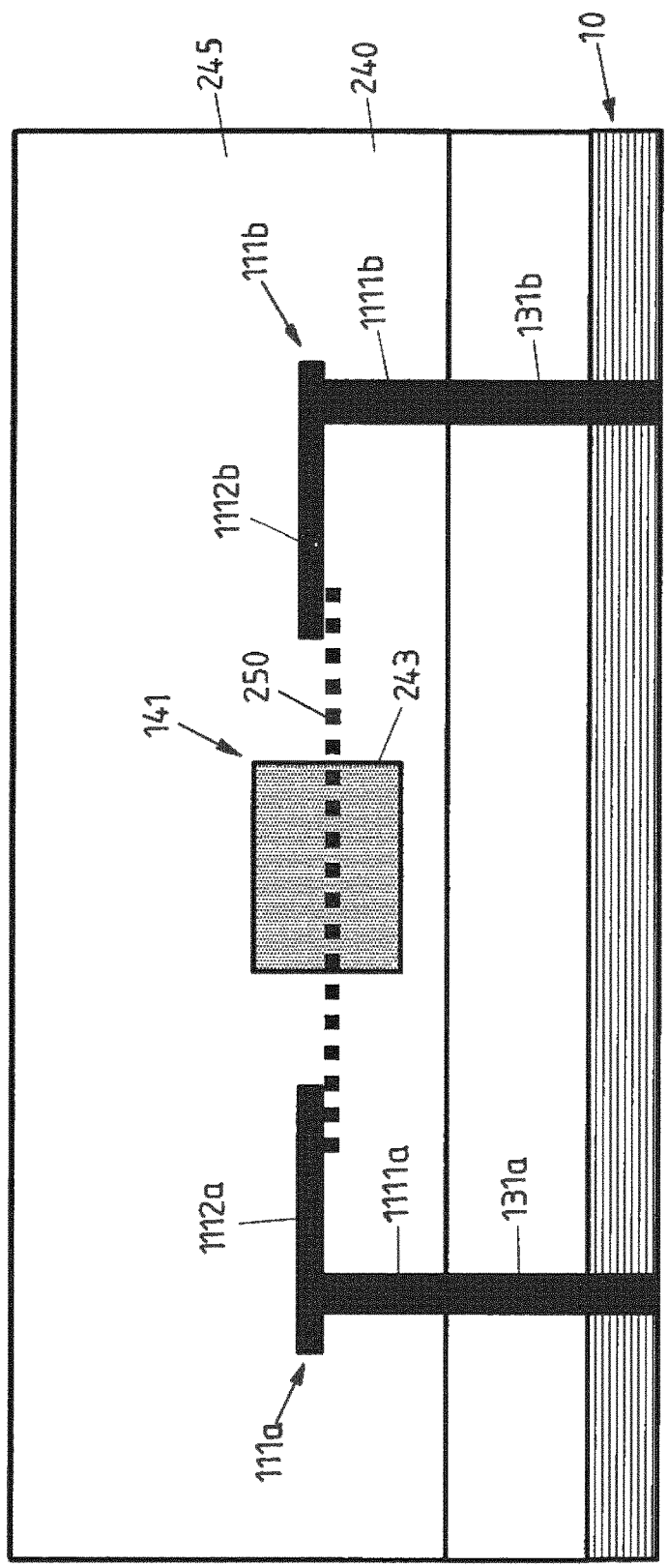
Figure 18:
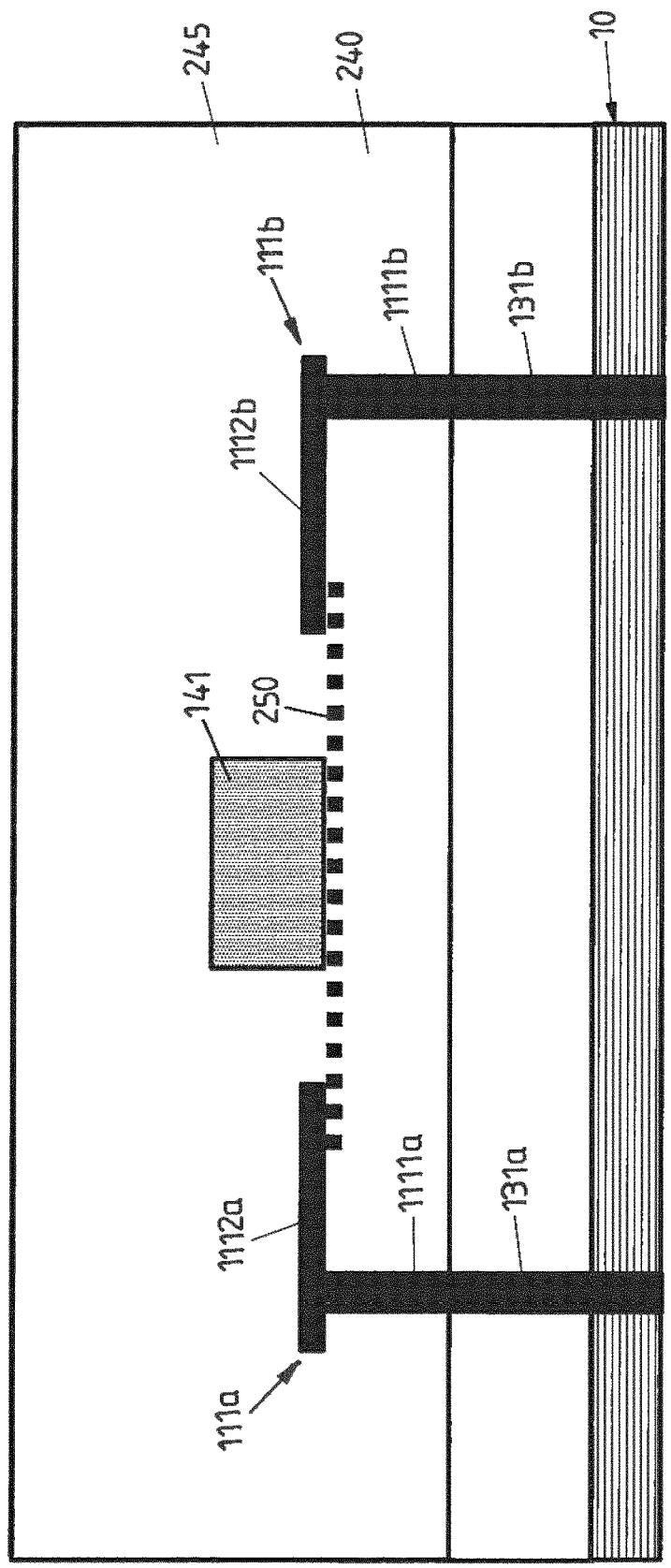
FIG. 18 shows a section through an alternative structure of the circuit assembly according to the invention.

After the (in particular lateral) structuring of the polymer layer 244 a further polymer layer 245 is applied and cured, which forms an upper cladding layer of the optical waveguide, as shown in FIG. 17. The polymer layer 245 can be formed of the same polymer material as the lower polymer layer 240. The optical plane hence is completed. Now, the electrical plane can be equipped and/or the optical plane can be connected to or compressed with a further carrier in a sandwich structure. FIG. 18 relates to a modification of the production method, according to which the waveguide core 141 is produced in one step. After producing the active layer 250 a core material layer (in particular similar to the polymer layer 244 of FIG. 15) therefor is applied on the lower polymer layer 240 and structured (in particular etched) correspondingly. The waveguide core 141 produced in this way adjoins the active layer 250, i.e. in this variant the active layer 250 does not extend through the waveguide core. It is also conceivable that the waveguide core 241 is not produced in the upper cladding layer 245, but in the lower cladding layer 240.

Figure 19:
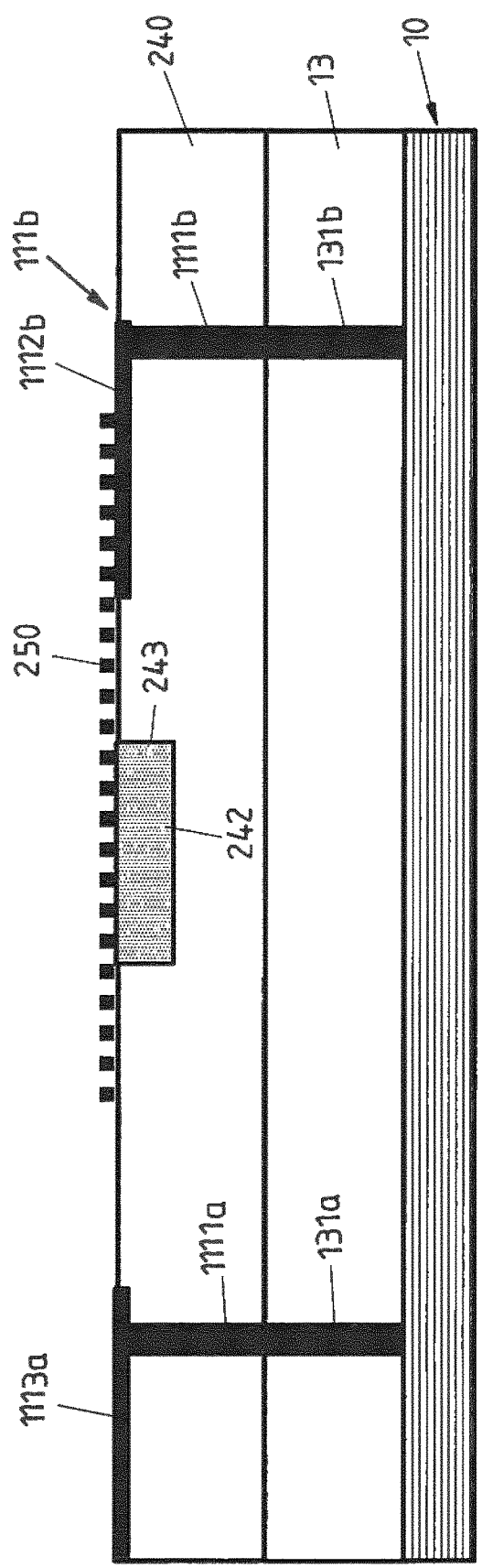
FIGS. 19 to 23 show steps in the production of a circuit assembly according to the invention with an electro-optical element in the form of a modulator.
Figure 20:
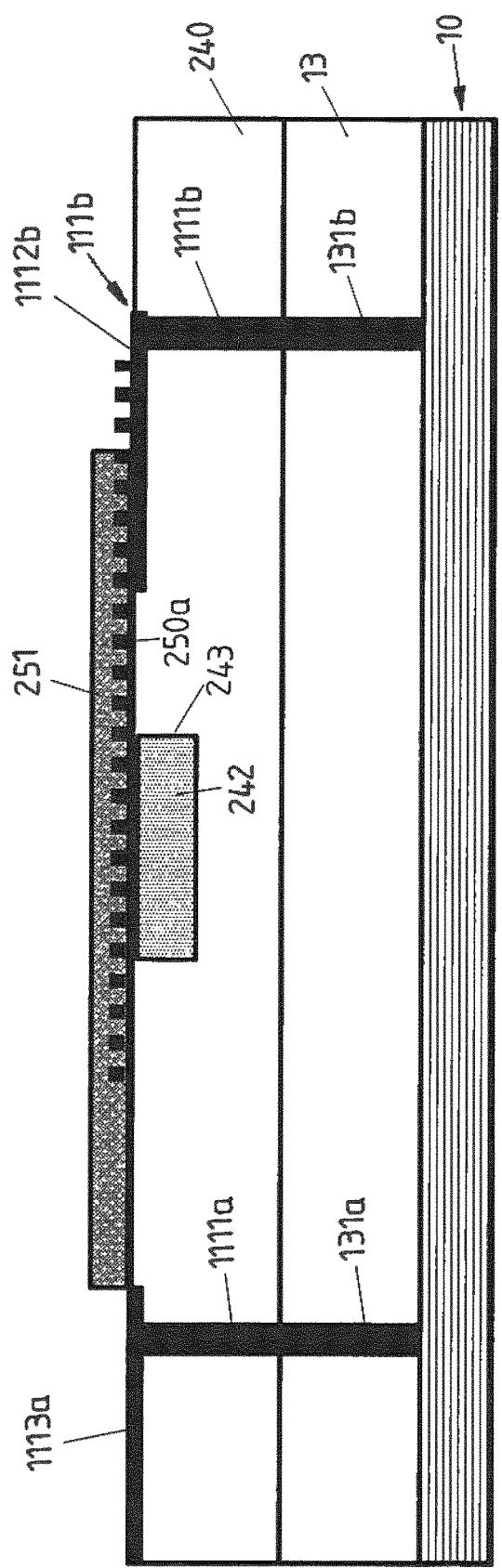

For producing a circuit board with an electro-optical element which can be operated as a light modulator (in particular as an electroabsorption modulator), a first, lower electro-optically active layer 250a and subsequently a dielectric layer 251 is produced (FIGS. 19 and 20) in a modification of the method of FIGS. 12 to 17 after producing the right-hand contact 111b. As dielectric layer 251 e.g. a silicon nitride layer (for example with a thickness of a few 10 nm, e.g. 35 nm) is produced (e.g. sputtered on).

The lower electro-optically active layer 250a is in contact with the upper section 1112b (e.g. in the form of a gold contact) of the contact 111b. Beside the right-hand contact 111b a part of the left-hand contact 111a also is produced, namely its first section 1111a reaching through the through-opening 131a and a part 1113a of the upper section 1111a.

Figure 21:
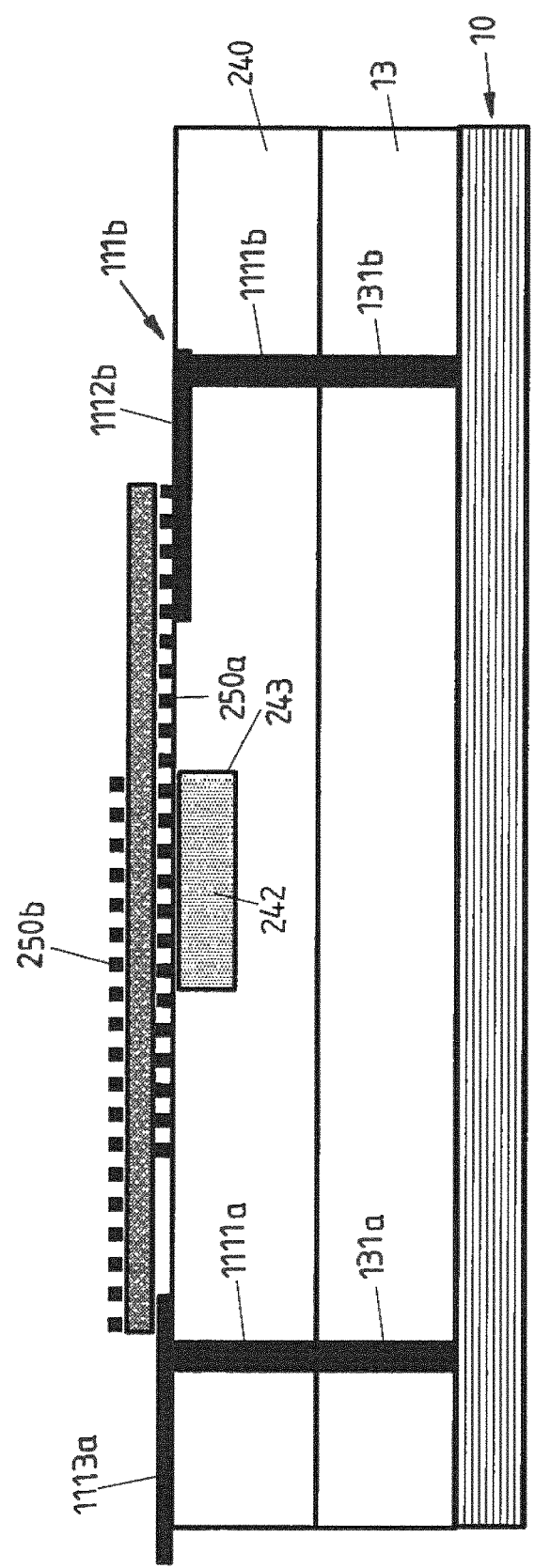
Figure 22:
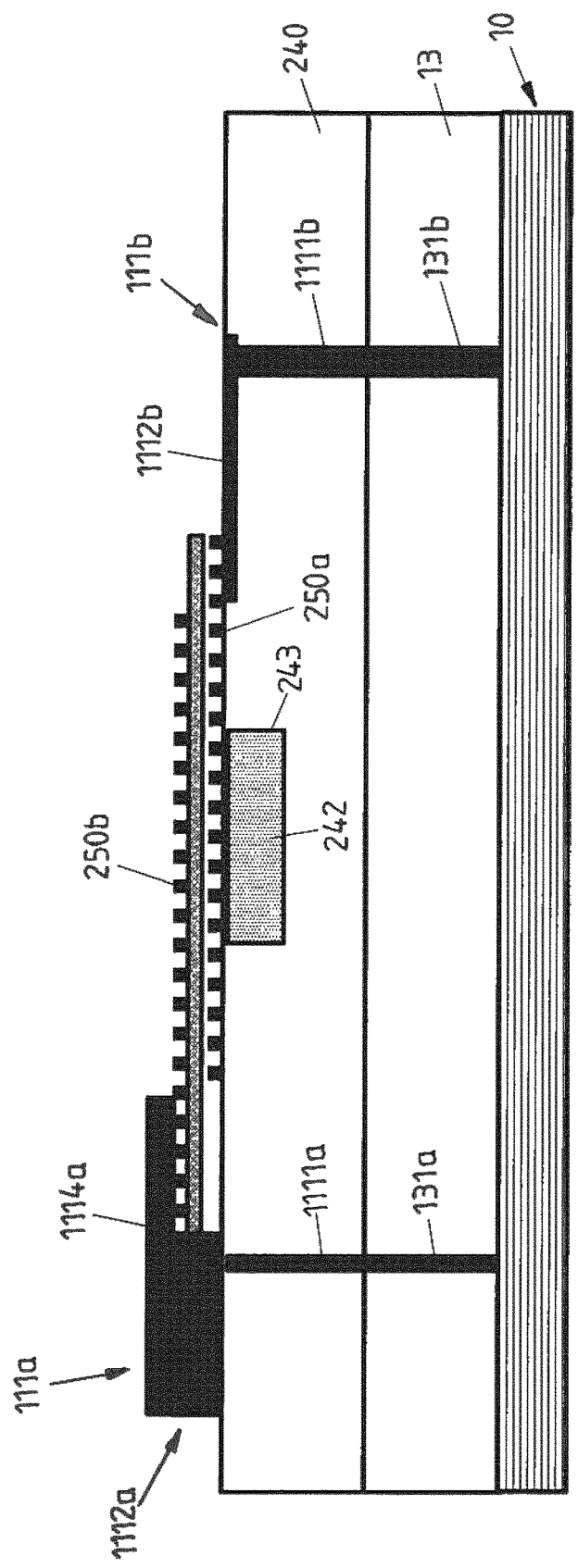
Figure 23:
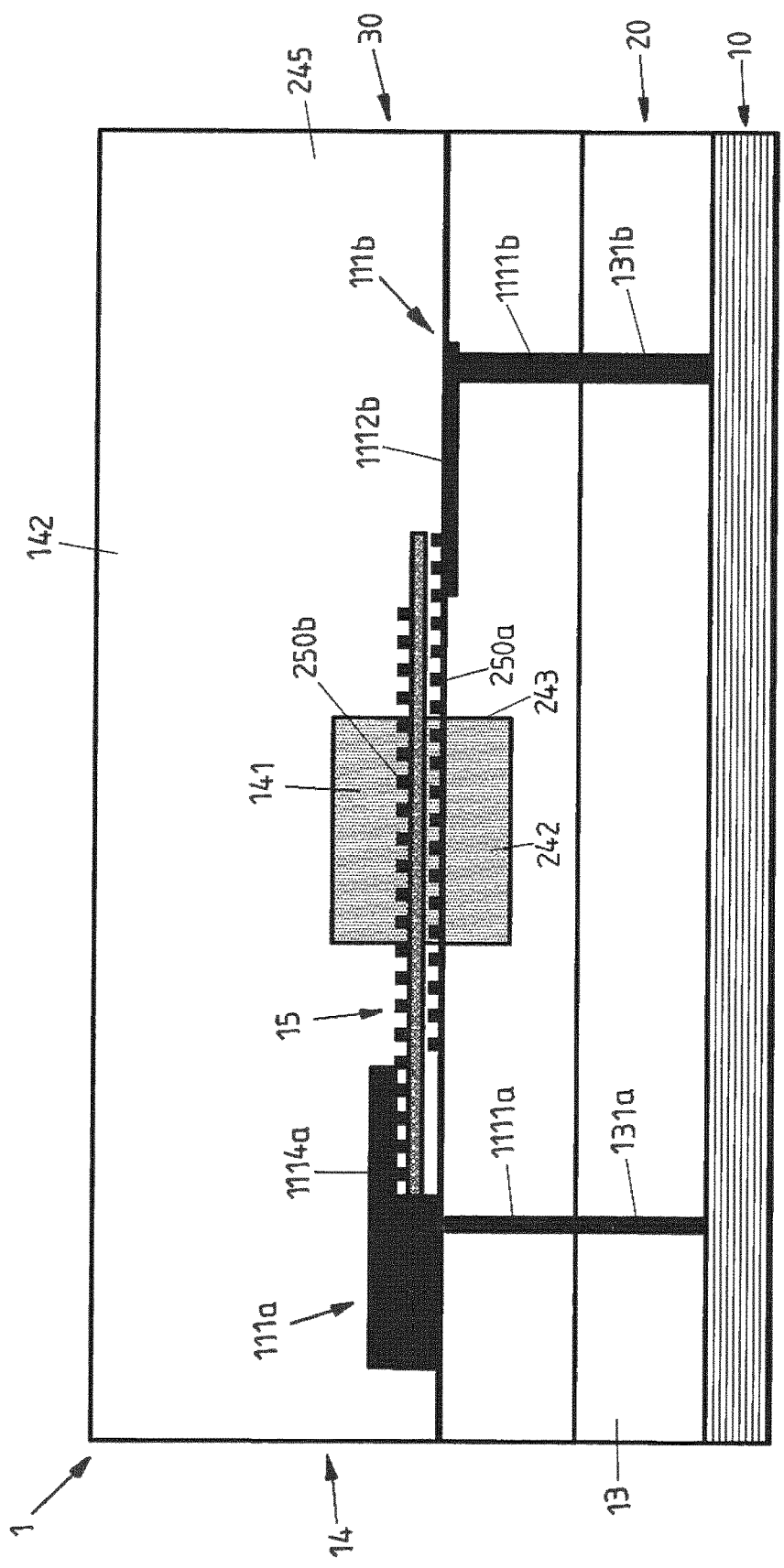

After arranging the dielectric layer 251 a second, upper electro-optically active layer 250b is produced, which at least sectionally is arranged on the dielectric layer 251 (FIG. 21). The electro-optically active layers 250a, 250b in particular each consist of a two-dimensional material (e.g. graphene), wherein more than two of these layers can also be provided. After producing the upper active layer 250b, a further part 1114a of the contact 111a is produced in order to complete the upper contact section 1112a of the contact 111a (FIG. 22). The part 1114a of the contact 111a contacts a section of the upper active layer 250b, so that an electro-optically active element similar to that of FIG. 9 is obtained. Subsequently, the upper polymer cladding layer 245 is produced, as shown in FIG. 23.

Figure 24:
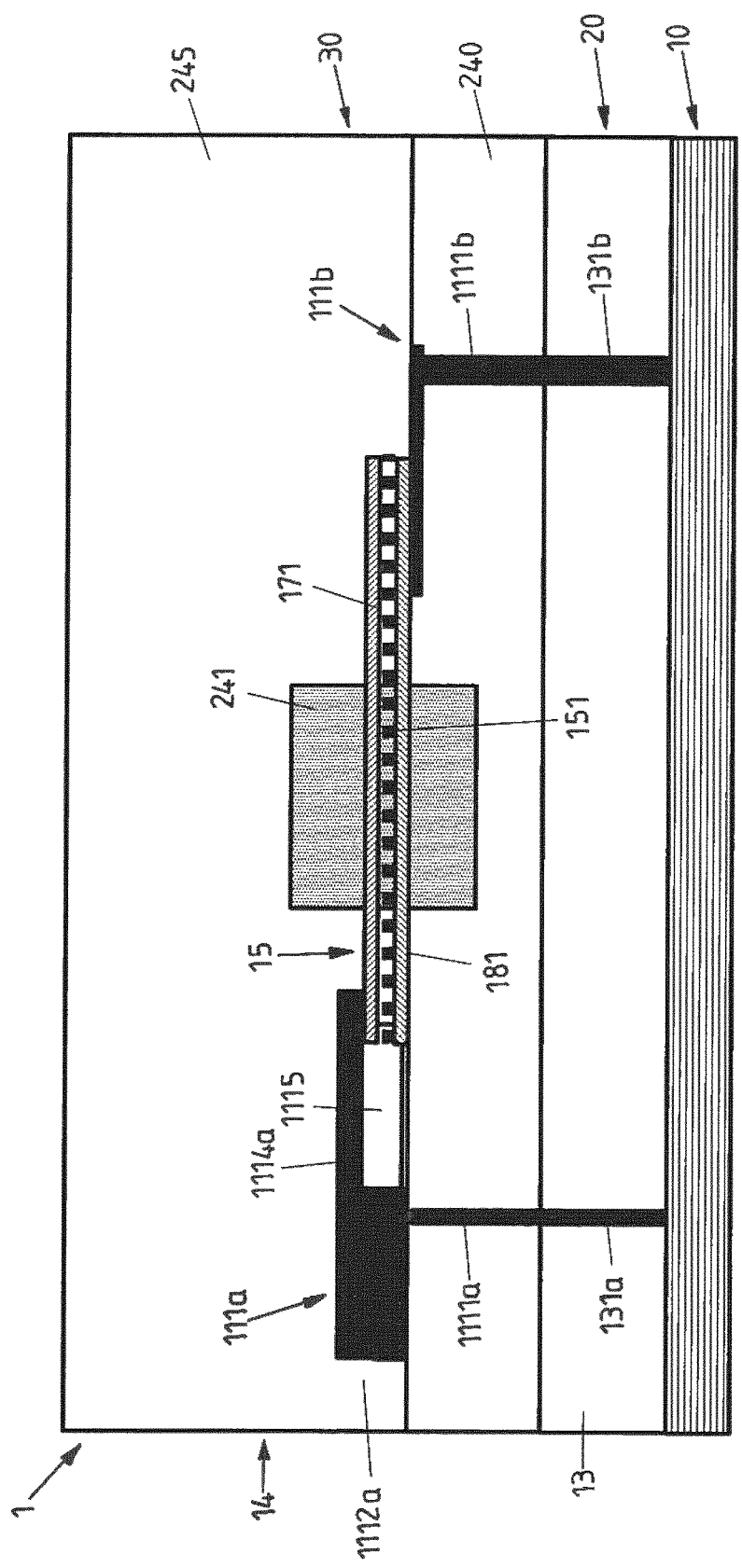
FIG. 24 shows a section through an alternative structure of the circuit assembly of the invention, according to which the modulator is formed of layers of a III-V semiconductor.

It is also conceivable that the electro-optically active element is not constructed of layers of a two-dimensional material, but of semiconductor layers, e.g. similar to the electro-optical element of FIG. 7. The production of the circuit board or the corresponding circuit board section is effected analogous to FIGS. 19 to 22. The finished structure is shown in FIG. 24, according to which the sub-section 1114a of the contact 111a in particular is separated from the active layer 151 by means of an insulation 1115 (e.g. of silicon nitride or silicon oxide).

For the formation of the active layer 151 in particular in a wavelength range of 1 µm to 1.6 µm e.g. lattice-matched InGaAs layers on an InP substrate can be used. Such layers are grown e.g. by means of a metal-organic chemical gas phase deposition (MOCVD) on an InP substrate. For the above-mentioned epitaxy-lift-off technique (ELO technique) a thin sacrificial layer of a selectively easily etchable material (e.g. AlAs) first is grown. Thereafter, a thin layer (e.g. with a thickness between 100 nm-200 nm) of the active material—e.g. InGaAs—is epitaxially grown, wherein to achieve the desired component function dopings also are possible. For particularly fast photoconductor detectors iron atoms can be incorporated as recombination centers. For the formation of conductive surfaces and p-n junctions e.g. a sequence of Zn doping—undoped—S doping can be effected, wherein the doping can also be placed in edge layers of InP (InP:n/InGaAs/InP:p hetero structure).

After the epitaxial growth the (in particular flexible) carrier 251 (see FIG. 13) is vapor-deposited; for example in the form of a metal layer (e.g. a gold layer). In the last step, the epitaxial substrate is dipped into an etching solution selective for the sacrificial layer and in this way the semiconductor layer and the carrier are separated from the (thick) epitaxial substrate.

The upper contact section (cf. contact 1112a in FIG. 24) must be connected to the lower contact section (section 1111a in FIG. 24) without shorting out, which is why the dielectric layer 1115 is provided as an insulator. In the layer 1115 openings and, above the lateral sections (contact areas) of the active layer, windows can be opened, which then are suitably connected to each other by vapor deposition of gold and structuring. It may be advantageous when the same active layer is used for a modulator and a detector, i.e. only one ELO and transfer process is required. An electroabsorption modulator can also be used inversely as a detector by applying a voltage in blocking direction; the photocurrent follows the optical modulation at high speed.

It is noted that when realizing a light absorption modulator by means of at least two material layers formed of a two-dimensional material (cf. e.g. also FIGS. 8 and 9) instead of two semiconductor layers, a connection of the upper contact sections to the lower contact sections likewise must become possible without shorting out. This can be effected analogous to the realization of the light absorption modulator by means of semiconductor layers, i.e. by arranging an insulating layer similar to the layer 1115 in FIG. 24.

In the modulator which includes active material layers formed of a two-dimensional material it is also possible analogous to the semiconductor modulator to connect the active layers in parallel in order to realize a photoconductor detector. It is conceivable in particular that the same active layers are used in order to realize both a light absorption modulator and a light detector. For example, the light detector in this case adjoins the light absorption modulator.

FIG. 25 shows another embodiment of the circuit assembly according to the invention again in the form of a circuit board, wherein two optical waveguides 14a, 14b are present in order to produce an optical communication connection between two ICs 11, 12. Into the optical waveguide 14a, 14b electro-optically active material layers 151', 151" (modulators or parts of modulators) and 161', 161" (detectors or parts of detectors) each are integrated, wherein the electro-optically active material layers 151', 151", 161', 161" are arranged adjacent to a core 141a, 141b of the respective waveguide 14a, 14b or at least partially extend within the core 141a, 141b.

It should be noted that elements of the exemplary embodiments described above can of course also be used in combination with each other. For example, in the variants of FIGS. 1 to 11 analogous to FIG. 25 a plurality of optical waveguides and thus a plurality of communication paths between the ICs 11 and 12 can of course be realized.

The invention claimed is:

1. A circuit assembly, comprising
at least one electronic circuit;
at least one optical waveguide, wherein the core and the cladding of the optical waveguide are formed of an amorphous material;
at least one carrier on which the optical waveguide is arranged; and
at least one electro-optically active material layer electrically connected to the electronic circuit, wherein:
the at least one electro-optically active material layer at least partially extends in the optical waveguide and the electrical connection between the electronic circuit and the at least one electro-optically active material layer is produced in that at least one electrical contact extends from the electronic circuit through at least one section of the cladding of the optical waveguide to the at least one electro-optically active material layer or is connected to a section of the electro-optically active material layer, which protrudes from the cladding of the optical waveguide,
the electronic circuit is arranged indirectly or directly at the carrier, and
the at least one electro-optically active material layer at least partially extends in the core, adjoins the core of the optical waveguide from above or adjoins the core of the optical waveguide from below.

2. The circuit assembly according to claim 1, wherein the circuit assembly is a circuit board or a microchip.

3. The circuit assembly according to claim 1, wherein at least one of:
the at least one electro-optically active material layer is configured to convert an electrical signal received from the electronic circuit via the electrical contact into an optical signal propagating in the optical waveguide and/or to convert an optical signal propagating in the optical waveguide into an electrical signal to be passed to the electronic circuit via the electrical contact, and
the at least one electro-optically active material layer at least partially extends in the core, adjoins the core of the optical waveguide from above or adjoins the core of the optical waveguide from below.

4. The circuit assembly according to claim 1, wherein at least one of the cladding and the core of the waveguide are formed of an electrically insulating material.

5. The circuit assembly according to claim 1, wherein at least one of:
the optical waveguide is at least partially formed of a material which was produced on the carrier from the liquid phase or the gas phase, and
the optical waveguide is at least partially formed of a polymer material, silicon dioxide and/or silicon nitride.

6. The circuit assembly according to claim 1, wherein the electronic circuit and the optical waveguide are arranged on different sides of the carrier.

7. The circuit assembly according to claim 6, wherein the electrical contact extends through a through-opening in the carrier.

8. The circuit assembly according to claim 1, wherein the optical waveguide extends between:
two carriers or
the electronic circuit and the carrier.

9. The circuit assembly according to claim 1, wherein at least one of:
the at least one electro-optically active material layer is formed of another material than the waveguide, and
the at least one electro-optically active material layer is formed of a crystalline material.

10. The circuit assembly according to claim 1, wherein the at least one electro-optically active material layer includes a two-dimensional material or a semiconductor material or is formed of such a material.

11. The circuit assembly according to claim 10, wherein the two-dimensional material is formed of graphene, triazine-based graphitic carbon nitride, germanene, molybdenum disulfide, molybdenum diselenide, silicene and/or black phosphorus or includes at least one of these materials.

12. The circuit assembly according to claim 10, wherein the semiconductor material is a III-V semiconductor material.

13. The circuit assembly according to claim 12, wherein a plurality of electro-optically active material layers are present, which differ in their band gap and/or their doping.

14. The circuit assembly according to claim 1, wherein the electrical contact is connected to a section of the electro-optically active material layer, which extends outside the core of the optical waveguide.

15. The circuit assembly according to claim 1, wherein the core of the optical waveguide has a cross-section of at least 1 µm$^2$ or at least 5 µm$^2$ and/or the electro-optically active material layer has a thickness of not more than 500 nm or not more than 200 nm or not more than 50 nm.

16. The circuit assembly according to claim 1, wherein the at least one electro-optically active material layer or a multilayer structure with the at least one electro-optically active material layer forms a modulator for modulating a light source external to the optical waveguide or is part of such a modulator, and/or the electro-optically active material layer forms a light detector or is part of a light detector and/or the electro-optically active material layer is formed to amplify light and/or to generate light or is part of a light amplifier, an LED or a laser.

17. A method for producing a circuit assembly, comprising the following steps:
providing a carrier;
arranging an amorphous material layer on the carrier, which forms a section of a cladding of an optical waveguide;
arranging at least one electro-optically active layer on the material layer;
producing an electrical contact which at least partially extends through the amorphous material layer or past the amorphous material layer up to the electro-optically active layer, wherein:
a cutout is produced in the amorphous material layer and the cutout is filled with a core material before arranging the electro-optically active layer in order to produce at least a part of a core of the optical waveguide, wherein the electro-optically active layer is arranged on the amorphous material layer such that it extends across the core material.

18. The method according to claim 17, wherein before being arranged on the amorphous material layer the at least one electro-optically active layer is disposed on a carrier material different from the carrier, which is removed after arranging the electro-optically active layer on the amorphous material layer.

19. The method according to claim 18, wherein the at least one electro-optically active layer is structured after removing the carrier material.

20. The method according to claim 17, wherein on the amorphous material layer and the electro-optically active layer a core material layer is arranged and structured such that it at least forms a part of a core of the optical waveguide.

\* \* \* \* \*